(12) United States Patent
Zhang

(10) Patent No.: US 11,169,360 B2
(45) Date of Patent: Nov. 9, 2021

(54) CAMERA LENS ASSEMBLY COMPRISING FOUR LENSES OF +-+-, FIVE LENSES OF +-+-, SIX LENSES OF +-+-+-, OR SEVEN LENSES OF +-++++-, REFRACTIVE POWERS

(71) Applicant: ZHEJIANG SUNNY OPTICAL CO., LTD., Ningbo (CN)

(72) Inventor: Kaiyuan Zhang, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 229 days.

(21) Appl. No.: 16/273,816

(22) Filed: Feb. 12, 2019

(65) Prior Publication Data

US 2019/0187414 A1    Jun. 20, 2019

Related U.S. Application Data

(63) Continuation of application No. PCT/CN2018/085626, filed on May 4, 2018.

(30) Foreign Application Priority Data

Aug. 23, 2017   (CN) .......................... 201710730290.9
Aug. 23, 2017   (CN) .......................... 201721061388.1

(51) Int. Cl.
*G02B 13/00* (2006.01)
*G02B 9/34* (2006.01)
(Continued)

(52) U.S. Cl.
CPC ............. *G02B 13/004* (2013.01); *G02B 9/34* (2013.01); *G02B 9/60* (2013.01); *G02B 9/62* (2013.01);
(Continued)

(58) Field of Classification Search
CPC ........ G02B 13/004; G02B 13/00; G02B 9/34; G02B 9/64; G02B 13/0045; G02B 9/62; G02B 9/60
See application file for complete search history.

(56) References Cited

U.S. PATENT DOCUMENTS

2005/0041306 A1    2/2005  Matsuo
2014/0209786 A1*   7/2014  Sano ................. H01L 27/14625
                                                250/208.1
(Continued)

FOREIGN PATENT DOCUMENTS

CN    102156342 A    8/2011
CN    104090352 A    10/2014
(Continued)

*Primary Examiner* — Wen Huang
(74) *Attorney, Agent, or Firm* — Barnes & Thornburg LLP

(57) ABSTRACT

The present disclosure discloses a camera lens assembly. The camera lens assembly includes, sequentially along an optical axis from an object side to an image side: a first lens having a positive refractive power, a second lens having a negative refractive power and at least one subsequent lens. A lens closest to the image side of the camera lens assembly is a negative lens having a negative refractive power, and a lens adjacent to the negative lens is a positive lens having a positive refractive power. The camera lens assembly further includes a curved image plane, and a radius of curvature RI of the image plane and a total effective focal length f of the camera lens assembly satisfy: |f/RI|≤0.35.

11 Claims, 15 Drawing Sheets

(51) Int. Cl.
*G02B 9/64* (2006.01)
*G02B 9/62* (2006.01)
*G02B 9/60* (2006.01)

(52) U.S. Cl.
CPC ............... *G02B 9/64* (2013.01); *G02B 13/00* (2013.01); *G02B 13/0045* (2013.01)

(56) References Cited

U.S. PATENT DOCUMENTS

| | | | |
|---|---|---|---|
| 2016/0086994 A1 | 3/2016 | Guenter | |
| 2017/0293116 A1* | 10/2017 | Matsumoto | G02B 13/18 |
| 2018/0239115 A1* | 8/2018 | Hsu | G02B 9/64 |
| 2019/0025551 A1* | 1/2019 | Kuo | G02B 13/0045 |
| 2019/0056565 A1* | 2/2019 | Yang | G02B 9/34 |
| 2019/0056568 A1* | 2/2019 | Huang | G02B 9/64 |
| 2020/0096732 A1* | 3/2020 | Lee | G02B 13/0045 |

FOREIGN PATENT DOCUMENTS

| | | |
|---|---|---|
| CN | 106896481 A | 6/2017 |
| CN | 107300756 A | 10/2017 |
| CN | 207148937 U | 3/2018 |

* cited by examiner

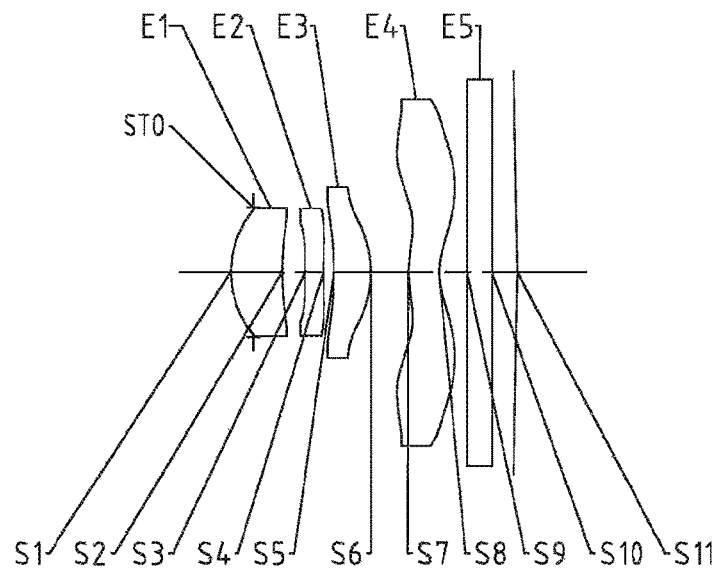
Fig. 1
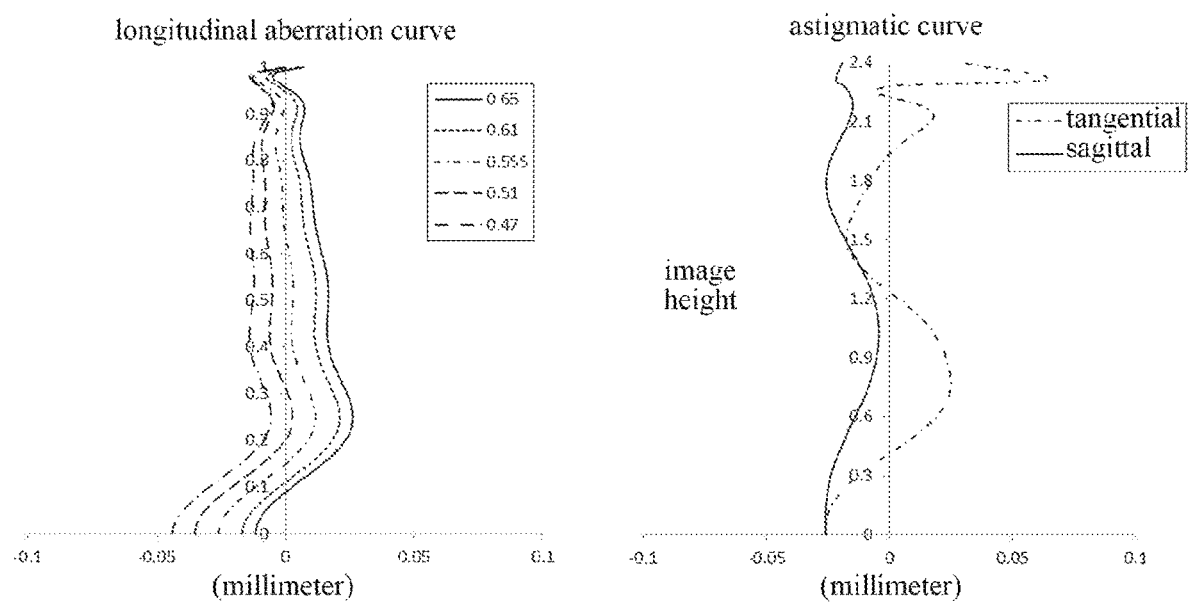
Fig. 2A
Fig. 2B

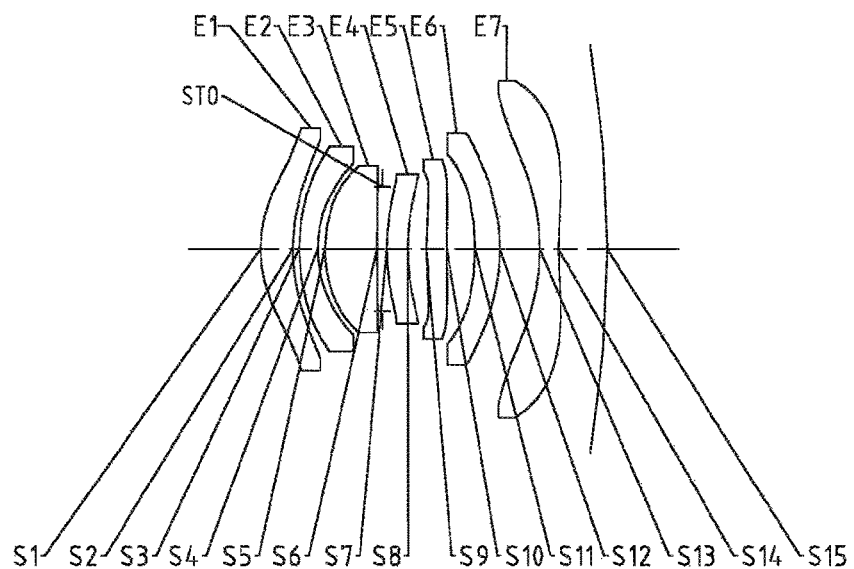
Fig. 17
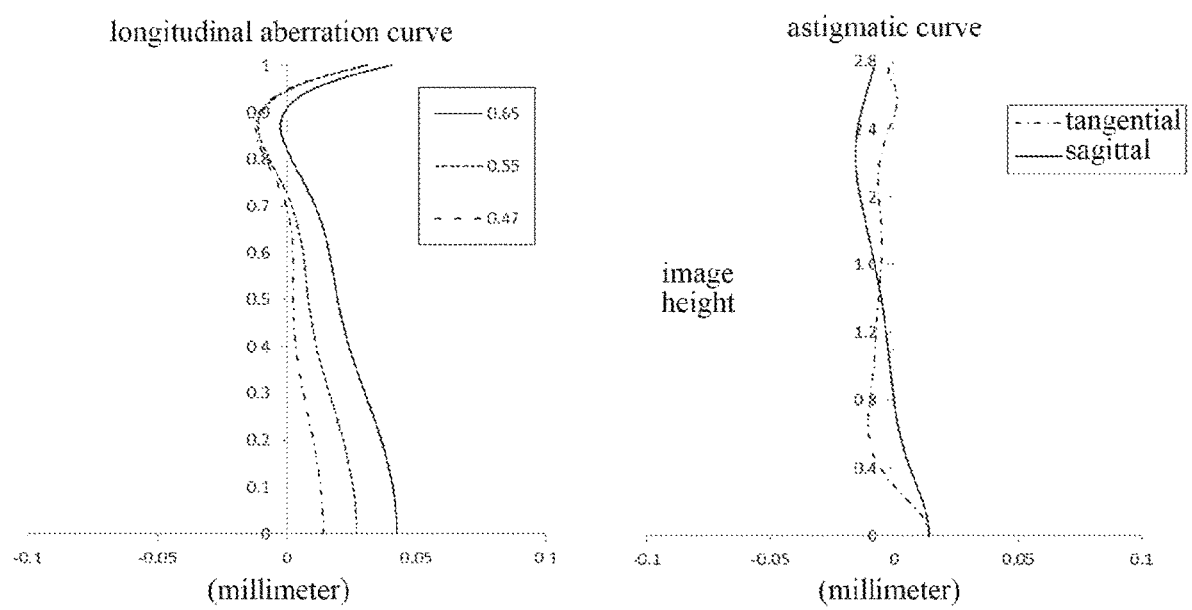
Fig. 18A
Fig. 18B

CAMERA LENS ASSEMBLY COMPRISING FOUR LENSES OF +-+-, FIVE LENSES OF +-+-, SIX LENSES OF +-+-+-, OR SEVEN LENSES OF +-++++-, REFRACTIVE POWERS

CROSS-REFERENCE TO RELATED APPLICATIONS

This is a continuation of International Application PCT/CN2018/085626, with an international filing date of May 4, 2018, which claims priorities and rights to Chinese Patent Application No. 201710730290.9 filed with the China National Intellectual Property Administration (CNIPA) on August 23 and Chinese Patent Application No. 201721061388.1 filed with the CNIPA on Aug. 23, 2017, the disclosures of which are hereby incorporated by reference in their entireties.

TECHNICAL FIELD

The present disclosure relates to a camera lens assembly, and more specifically to a camera lens assembly having a curved image plane.

BACKGROUND

At present, commonly used photosensitive elements in optical systems include CCD (Charge-Coupled Device) and CMOS (Complementary Metal-Oxide Semiconductor). With the improvement of performance and reduction in size of these commonly used photosensitive elements, corresponding requirements on high imaging quality and miniaturization of camera lens assemblies used in combination with the photosensitive elements have been put forward.

SUMMARY

The present disclosure provides a camera lens assembly that may at least solve or partially solve at least one of the above disadvantages in the existing technology.

According to an aspect, the present disclosure provides a camera lens assembly. The camera lens assembly may includes, sequentially along an optical axis from an object side to an image side: a first lens having a positive refractive power, a second lens having a negative refractive power and at least one subsequent lens. A lens closest to the image side of the camera lens assembly is a negative lens having a negative refractive power, and a lens adjacent to the negative lens is a positive lens having a positive refractive power. The camera lens assembly may further include a curved image plane, and a radius of curvature RI of the image plane and a total effective focal length f of the camera lens assembly may satisfy: $|f/RI| \leq 0.35$.

In an implementation, the at least one subsequent lens includes, sequentially along the optical axis from the second lens to the image side: a third lens and a fourth lens. The third lens may have a positive refractive power. The fourth lens may have a negative refractive power, and an image-side surface of the fourth lens may be a concave surface.

In an implementation, the at least one subsequent lens includes, sequentially along the optical axis from the second lens to the image side: a third lens, a fourth lens and a fifth lens. The third lens has a positive refractive power or a negative refractive power. The fourth lens may have a positive refractive power. The fifth lens may have a negative refractive power, and an image-side surface of the fifth lens may be a concave surface.

In an implementation, the at least one subsequent lens includes, sequentially along the optical axis from the second lens to the image side: a third lens, a fourth lens, a fifth lens and a sixth lens. Each of the third lens and the fourth lens has a positive refractive power or a negative refractive power. The fifth lens may have a positive refractive power. The sixth lens may have a negative refractive power, and an image-side surface of the sixth lens may be a concave surface.

In an implementation, the at least one subsequent lens includes, sequentially along the optical axis from the second lens to the image side: a third lens, a fourth lens, a fifth lens, a sixth lens and a seventh lens. Each of the third lens, the fourth lens and the fifth lens has a positive refractive power or a negative refractive power. The sixth lens may have a positive refractive power. The seventh lens may have a negative refractive power, and an image-side surface of the seventh lens may be a concave surface.

In an implementation, an object-side surface of the first lens is a convex surface, and a radius of curvature R1 of the object-side surface of the first lens and the total effective focal length f of the camera lens assembly may satisfy: $2 < f/R1 < 5$.

In an implementation, an effective focal length f1 of the first lens and an effective focal length fn of the negative lens may satisfy: $-3.0 < f1/fn \leq -0.5$.

In an implementation, a center thickness CT2 of the second lens on the optical axis and a center thickness CTn of the negative lens on the optical axis may satisfy: $0.5 \leq CT2/CTn \leq 1.0$.

In an implementation, an abbe number V1 of the first lens and an abbe number Vp of the positive lens may satisfy: $1 \leq V1/Vp < 3$.

In an implementation, a center thickness CT1 of the first lens on the optical axis and a center thickness CTp of the positive lens on the optical axis may satisfy: $1 < CT1/CTp < 2$.

In an implementation, an entrance pupil diameter EPD of the camera lens assembly and half a maximum image height ImgH of the camera lens assembly may satisfy: $0.6 \leq EPD/ImgH \leq 0.8$.

In an implementation, the total effective focal length f of the camera lens assembly and the entrance pupil diameter EPD of the camera lens assembly may satisfy: $1.5 \leq f/EPD \leq 2.8$.

In an implementation, a distance TTL on the optical axis from an object-side surface of the first lens to the image plane may satisfy: $3.0 \text{ mm} < TTL < 7.5 \text{ mm}$.

In an implementation, the distance TTL on the optical axis from the object-side surface of the first lens to the image plane and half a maximum image height ImgH of the camera lens assembly may satisfy: $TTL/ImgH \leq 1.75$.

According to another aspect, the present disclosure provides a camera lens assembly. The camera lens assembly may include, sequentially along an optical axis from an object side to an image side: a first lens having a positive refractive power, a second lens having a negative refractive power and at least one subsequent lens. A lens closest to the image side of the camera lens assembly is a negative lens having a negative refractive power, and a lens adjacent to the negative lens is a positive lens having a positive refractive power. The camera lens assembly may further include a curved image plane, and a distance TTL on the optical axis from an object-side surface of the first lens to the image plane and half a maximum image height ImgH of the camera lens assembly may satisfy: $TTL/ImgH \leq 1.75$.

The camera lens assembly provided with a curved image plane provided by the present disclosure can effectively improve aberrations while ensuring the performance of the lens assembly.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIG. 1 is a schematic structural diagram illustrating a camera lens assembly according to Embodiment 1 of the present disclosure;

FIGS. 2A-2D respectively illustrate a longitudinal aberration curve, an astigmatic curve, a distortion curve and a lateral color curve of the camera lens assembly according to Embodiment 1;

FIG. 17 is a schematic structural diagram illustrating a camera lens assembly according to Embodiment 9 of the present disclosure;

FIGS. 18A-18D respectively illustrate a longitudinal aberration curve, an astigmatic curve, a distortion curve and a lateral color curve of the camera lens assembly according to Embodiment 9;

DETAILED DESCRIPTION OF EMBODIMENTS

Figures 2C, 2D:
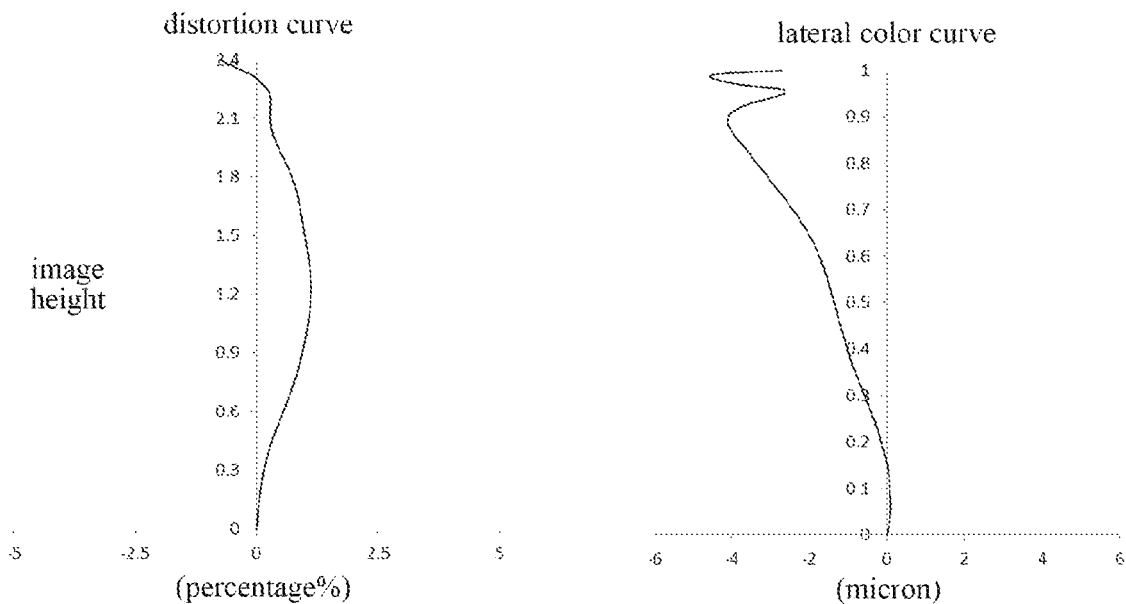

For a better understanding of the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area near the optical axis. If the surface of a lens is a convex surface and the position of the convex surface is not defined, it indicates that the surface of the lens is convex at least at the paraxial area; if the surface of a lens is a concave surface and the position of the concave surface is not defined, it indicates that the surface of the lens is concave at least at the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The camera lens assembly according to exemplary implementations of the present disclosure includes, sequentially along an optical axis from an object side to an image side: a first lens having a positive refractive power, a second lens having a negative refractive power and at least one subsequent lens. The camera lens assembly further includes a curved image plane.

An object-side surface of the first lens may be a convex surface. A radius of curvature R1 of the object-side surface of the first lens and a total effective focal length f of the camera lens assembly may satisfy: $2<f/R1<5$, and more specifically, f and R1 may further satisfy: $2.25 \leq f/R1 \leq 3.71$. By controlling the range of the radius of curvature of the first lens, a negative spherical aberration generated by the first lens can be controlled within a reasonable range, thereby causing the burden of a subsequent negative assembly member (i.e., lenses having negative refractive powers between the first lens and the image side) of balancing the negative spherical aberration generated by the first lens being moderate.

A radius of curvature RI of the image plane of the camera lens assembly and the total effective focal length f of the camera lens assembly may satisfy: $|f/RI| \leq 10.35$, and more specifically, f and R1 may further satisfy: $0.04 \leq |f/RI| \leq 0.30$. By the constraint of the conditional expression $|f/RI| \leq 0.35$, the bending of the image plane is guaranteed to be within a reasonable range, so that the curvature of field can be reasonably compensated, and the optical design can have more design freedom, thereby obtaining a good imaging quality.

In the camera lens assembly of an exemplary embodiment, in the direction from the image side to the object side, the lens having a refractive power and closest to the image plane is a negative lens having a negative refractive power (referred to herein as "the negative lens closest to the image side"), the lens having a refractive power and adjacent to the negative lens is a positive lens having a positive refractive power (referred to herein as "the positive lens closest to the image side"). The image-side surface of the negative lens closest to the image side may be a concave surface.

In an implementation, the at least one subsequent lens may include, sequentially along the optical axis from the second lens to the image side: a third lens and a fourth lens. The third lens may have a positive refractive power. The fourth lens may have a negative refractive power, and an image-side surface of the fourth lens may be a concave surface. In this implementation, the fourth lens is the negative lens closest to the image side; and the third lens is the positive lens closest to the image side.

In an implementation, the at least one subsequent lens may include, sequentially along the optical axis from the second lens to the image side: a third lens, a fourth lens and a fifth lens. The third lens has a positive refractive power or a negative refractive power. The fourth lens may have a positive refractive power. The fifth lens may have a negative refractive power, and an image-side surface of the fifth lens may be a concave surface. In this implementation, the fifth lens is the negative lens closest to the image side; and the fourth lens is the positive lens closest to the image side.

In an implementation, the at least one subsequent lens may include, sequentially along the optical axis from the second lens to the image side: a third lens, a fourth lens, a fifth lens and a sixth lens. Each of the third lens and the fourth lens has a positive refractive power or a negative refractive power. The fifth lens may have a positive refractive power. The sixth lens may have a negative refractive power, and an image-side surface of the sixth lens may be a concave surface. In this implementation, the sixth lens is the negative lens closest to the image side; and the fifth lens is the positive lens closest to the image side.

In an implementation, the at least one subsequent lens may include, sequentially along the optical axis from the second lens to the image side: a third lens, a fourth lens, a fifth lens, a sixth lens and a seventh lens. Each of the third lens, the fourth lens and the fifth lens has a positive refractive power or a negative refractive power. The sixth lens may have a positive refractive power. The seventh lens may have a negative refractive power, and an image-side surface of the seventh lens may be a concave surface. In this implementation, the seventh lens is the negative lens closest to the image side; and the sixth lens is the positive lens closest to the image side.

An effective focal length f1 of the first lens and an effective focal length fn of the negative lens may satisfy: $-3.0<f1/fn \leq -0.5$, and more specifically, f1 and fn may further satisfy: $-2.55 \leq f1/fn \leq -0.53$. By properly controlling the ratio of the positive focal length of the first lens to the negative focal length of the negative lens closest to the image side, most of primary spherical aberrations generated by the optical system can be efficiently balanced, so that the axial and paraxial field-of-view have good imaging qualities.

A center thickness CT2 of the second lens on the optical axis and a center thickness CTn of the negative lens closest to the image side on the optical axis may satisfy: $0.5 \leq CT2/CTn \leq 1.0$, and more specifically, CT2 and CTn may further satisfy: $0.56 \leq CT2/CTn \leq 1.00$. By controlling the ratio of the center thickness CT2 of the second lens to the center thickness CTn of the negative lens closest to the image side, the control capacity over a coma aberration is obtained, so that the optical system can obtain a good imaging quality.

An abbe number V1 of the first lens and an abbe number Vp of the positive lens closest to the image side may satisfy: $1 \leq V1/Vp<3$, and more specifically, V1 and Vp may further satisfy: $1.00 \leq V1/Vp \leq 2.74$. By reasonable selection of the material of the first lens and the positive lens closest to the image side, the ratio of the abbe number V1 of the first lens to the abbe number Vp of the positive lens closest to the image side is within a reasonable range, thereby making the optical system obtain a good ability to balance a chromatic aberration.

A center thickness CT1 of the first lens on the optical axis and a center thickness CTp of the positive lens on the optical axis may satisfy: 1<CT1/CTp<2, and more specifically, CT1 and CTp may further satisfy: 1.12≤CT1/CTp≤1.84. By constraining the ratio of the center thickness of the first lens to the center thickness of the positive lens closest to the image side, the distortion contribution rate of the two lenses can be adjusted to control the final distortion of the system within a reasonable interval, to satisfy imaging requirements.

An entrance pupil diameter EPD of the camera lens assembly and half a maximum image height ImgH of the camera lens assembly may satisfy: 0.6≤EPD/ImgH≤0.8, and more specifically, EPD and ImgH may further satisfy: 0.63≤EPD/ImgH≤0.78. Satisfying the conditional expression 0.6≤EPD/ImgH≤0.8 is conducive to the realization of beneficial effects such as large image plane and large aperture.

The total effective focal length f of the camera lens assembly and the entrance pupil diameter EPD of the camera lens assembly may satisfy: 1.5≤f/EPD≤2.8, and more specifically, f and EPD may further satisfy: 1.70≤f/EPD≤2.67. Satisfying the conditional expression 1.5≤f/EPD≤2.8 can ensure that the f-number of the system falls within a feasible commonly-used interval, thus ensuring that the optical system may obtain a suitable signal-to-noise ratio under a dark shooting condition.

A distance TTL on the optical axis from the center of the object-side surface of the first lens to the image plane of the camera lens assembly may satisfy: 3.0 mm<TTL<7.5 mm, and more specifically, TTL may further satisfy: 3.45 mm≤TTL≤5.30 mm. Satisfying the conditional expression 3.0 mm<TTL<7.5 mm can ensure the compactness of the optical system, so that the camera lens assembly meets general length requirements for a mobile phone lens assembly from wide angle to telephoto.

The distance TTL on the optical axis from the center of the object-side surface of the first lens to the image plane of the camera lens assembly and the half the maximum image height ImgH of the camera lens assembly may satisfy: TTL/ImgH≤1.75, and more specifically, TTL and ImgH may further satisfy: 1.40≤TTL/ImgH≤1.71. By satisfying the conditional expression TTL/ImgH≤1.75, the compactness of the system can be ensured, and the ultra-thin characteristic and miniaturization of the optical imaging lens assembly can be realized, so that the camera lens assembly can be suitably applied to a system of a limited size such as a portable electronic product.

In an exemplary implementation, the camera lens assembly may also be provided with at least one diaphragm to further enhance the imaging quality of the lens assembly. The diaphragm may be disposed at any position between the object side and the image side as needed.

Alternatively, the camera lens assembly may further include an optical filter for correcting the color deviation and/or a cover glass for protecting the photosensitive element on the image plane.

According to Petzval's design theory, minimization of the curvature of field usually requires the use of multiple optical elements (e.g., lenses with refractive powers). The multiple optical elements have contributions of curvature of field in different directions, and curvatures of field in different directions are superimposed and balanced to minimize the curvature of field. However, the use of more optical elements means an increase in design cost, processing cost, and assembly cost. In the current design, cooperating with the curved photosensitive element, the image plane may be designed as a curved surface consistent with the curvature of the photosensitive element, and such a design can effectively improve the imaging quality. At the same time, designing the image plane into a curved surface is equivalent to increasing the freedom of the lens assembly design, so that design indexes such as the field-of-view, the aperture, and the relative illumination can be effectively improved.

The camera lens assembly according to the embodiments of the present disclosure uses a curved image plane, which can effectively improve aberrations while having excellent imaging performance. In the implementations of the present disclosure, at least one of the surfaces of the each lens is an aspheric surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration. The use of the aspheric lens can eliminate as much as possible the aberrations that occur during the imaging, thereby further improving the imaging quality.

However, it should be understood by those skilled in the art that the various results and advantages described in the present specification may be obtained by changing the number of the lenses constituting the camera lens assembly without departing from the technical solution claimed by the present disclosure. For example, although four to seven lenses are described as examples in the embodiments, the optical imaging lens assembly is not limited to include four to seven lenses. If desired, the optical imaging lens assembly may also include other numbers of lenses.

Specific embodiments of the camera lens assembly that may be applied to the above implementations are further described below with reference to the accompanying drawings.

Embodiment 1

A camera lens assembly according to Embodiment 1 of the present disclosure is described below with reference to FIGS. 1-2D. FIG. 1 is a schematic structural diagram illustrating a camera lens assembly according to Embodiment 1 of the present disclosure.

As shown in FIG. 1, the camera lens assembly includes, sequentially along the optical axis from the object side to the image side, a first lens E1, a second lens E2, a third lens E3, a fourth lens E4 and an image plane S11. Here, the image plane S11 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a concave surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a concave surface, an image-side surface S6 of the third lens E3 is a convex surface, and the object-side surface S5 and the image-side surface S6 of the third lens E3 are both aspheric surfaces.

The fourth lens E4 has a negative refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

Alternatively, the camera lens assembly may further include an optical filter E5 having an object-side surface S9 and an image-side surface S10. Light from an object sequentially passes through the surfaces S1-S10 and finally forms an image on the image plane S11.

Alternatively, a diaphragm STO for limiting the light beam may be disposed between the object side and the first lens E1, for improving the imaging quality of the camera lens assembly.

In the present embodiment, the fourth lens E4 is the negative lens closest to the image side, and the third lens E3 is the positive lens closest to the image side.

Table 1 shows the surface type, the radius of curvature, the thickness, the material and the conic coefficient of each lens of the camera lens assembly in Embodiment 1. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2710 | | | |
| S1 | aspheric | 1.1755 | 0.6152 | 1.55 | 56.1 | 0.9922 |
| S2 | aspheric | 3.0253 | 0.2780 | | | 7.6291 |
| S3 | aspheric | −96.5970 | 0.2200 | 1.67 | 20.4 | −99.0000 |
| S4 | aspheric | 6.3315 | 0.1260 | | | 54.6114 |
| S5 | aspheric | −4.4811 | 0.4504 | 1.55 | 56.1 | −98.6205 |
| S6 | aspheric | −1.4917 | 0.4524 | | | −4.9748 |
| S7 | aspheric | 1.2218 | 0.3670 | 1.55 | 56.1 | −4.7012 |

TABLE 1-continued

| surface number | surface type | radius of curvature | thickness | material refractive index | abbe number | conic coefficient |
|---|---|---|---|---|---|---|
| S8 | aspheric | 0.7729 | 0.3367 | | | −3.7295 |
| S9 | spherical | infinite | 0.3000 | 1.52 | 64.2 | |
| S10 | spherical | infinite | 0.3042 | | | |
| S11 | spherical | −62.2899 | | | | |

The abbe number V1 of the first lens E1 and the abbe number Vp of the positive lens closest to the image side satisfy: V1/Vp=1.00. The center thickness CT1 of the first lens E1 on the optical axis and the center thickness CTp of the positive lens closest to the image side on the optical axis satisfy: CT1/CTp=1.37. The center thickness CT2 of the second lens E2 on the optical axis and the center thickness CTn of the negative lens closest to the image side on the optical axis satisfy: CT2/CTn=0.60.

In the present embodiment, each of the lenses may be an aspheric lens, and the surface type x of each aspheric surface is defined by the following formula:

$$x = \frac{ch^2}{1+\sqrt{1-(k+1)c^2h^2}} + \sum A_i h^i \qquad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in the above Table 1); and $A_i$ is the $i^{th}$ order correction coefficient of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the surfaces S1-S8 in Embodiment 1.

TABLE 2

| surface number | A4 | A6 | A8 | A10 | A12 |
|---|---|---|---|---|---|
| S1 | −2.0491E−01 | 2.4453E+00 | −2.5853E+01 | 1.5996E+02 | −6.2323E+02 |
| S2 | 1.9359E−03 | −1.3597E+00 | 2.0422E+01 | −1.8490E+02 | 1.0098E+03 |
| S3 | −4.2629E−01 | 2.8164E+00 | −4.4648E+01 | 3.7011E+02 | −1.8870E+03 |
| S4 | −2.9015E−01 | 1.0328E+00 | −8.2574E+00 | 3.9728E+01 | −1.3769E+02 |
| S5 | −3.4369E−01 | 1.2764E+00 | −3.1943E+00 | 1.6603E+00 | 2.3807E+01 |
| S6 | −6.0313E−01 | 1.6747E+00 | −5.8772E+00 | 2.0478E+01 | −5.2559E+01 |
| S7 | −8.5236E−01 | 9.8531E−01 | −8.3368E−01 | 5.9184E−01 | −3.1146E−01 |
| S8 | −4.7087E−01 | 5.6880E−01 | −5.0103E−01 | 3.0421E−01 | −1.2153E−01 |

| surface number | A14 | A16 | A18 | A20 |
|---|---|---|---|---|
| S1 | 1.5285E+03 | −2.2931E+03 | 1.9207E+03 | −6.8977E+02 |
| S2 | −3.4171E+03 | 6.9860E+03 | −7.9100E+03 | 3.8058E+03 |
| S3 | 5.8946E+03 | −1.0862E+04 | 1.0618E+04 | −4.0888E+03 |
| S4 | 3.3493E+02 | −5.2491E+02 | 4.6470E+02 | −1.7409E+02 |
| S5 | −8.5133E+01 | 1.3594E+02 | −1.1209E+02 | 3.8597E+01 |
| S6 | 9.0899E+01 | −9.4501E+01 | 5.2161E+01 | −1.1694E+01 |
| S7 | 1.1035E−01 | −2.4584E−02 | 3.0968E−03 | −1.6761E−04 |
| S8 | 3.0137E−02 | −4.1937E−03 | 2.6005E−04 | −2.3079E−06 |

Table 3 below shows the effective focal lengths f1-f4 of the lenses in Embodiment 1, the total effective focal length f of the camera lens assembly, the total track length TTL of the camera lens assembly (i.e., the distance on the optical axis from the center of the object-side surface S1 of the first lens E1 to the image plane S11) and the half of the maximal field-of-view HFOV of the camera lens assembly.

TABLE 3

| parameter | f1(mm) | f2(mm) | f3(mm) | f4(mm) | f(mm) | TTL(mm) | HFOV(°) |
|---|---|---|---|---|---|---|---|
| value | 3.15 | −8.92 | 3.89 | −5.42 | 2.72 | 3.45 | 41.2 |

The total track length of the camera lens assembly TTL=3.45 mm. The total effective focal length f of the camera lens assembly and the radius of curvature R1 of the object-side surface S1 of the first lens E1 satisfy: f/R1=2.32. The total effective focal length f of the camera lens assembly and the radius of curvature RI of the image plane S11 of the camera lens assembly satisfy: |f/RI|=0.04. The effective focal length f1 of the first lens E1 and the effective focal length fn of the negative lens closest to the image side satisfy: f1/fn=−0.58.

The entrance pupil diameter EPD of the camera lens assembly and the half the maximum image height ImgH of the camera lens assembly satisfy: EPD/ImgH=0.63. The total effective focal length f of the camera lens assembly and the entrance pupil diameter EPD of the camera lens assembly satisfy: f/EPD=1.79. The total track length TTL of the camera lens assembly and the half the maximum image height ImgH of the camera lens assembly satisfy: TTL/ImgH=1.44.

FIG. 2A illustrates the longitudinal aberration curve of the camera lens assembly according to Embodiment 1, representing deviations of focal points of light of different wavelengths converged after passing through the lens assembly. FIG. 2B illustrates the astigmatic curve of the camera lens assembly according to Embodiment 1, representing a curvature of the tangential image plane and a curvature of the sagittal image plane. FIG. 2C illustrates the distortion curve of the camera lens assembly according to Embodiment 1, representing amounts of distortion at different viewing angles. FIG. 2D illustrates the lateral color curve of the camera lens assembly according to Embodiment 1, representing deviations of different image heights on the image plane after light passes through the lens assembly. It can be seen from FIGS. 2A-2D that the camera lens assembly according to Embodiment 1 can achieve a good imaging quality.

Embodiment 2

Figure 3:
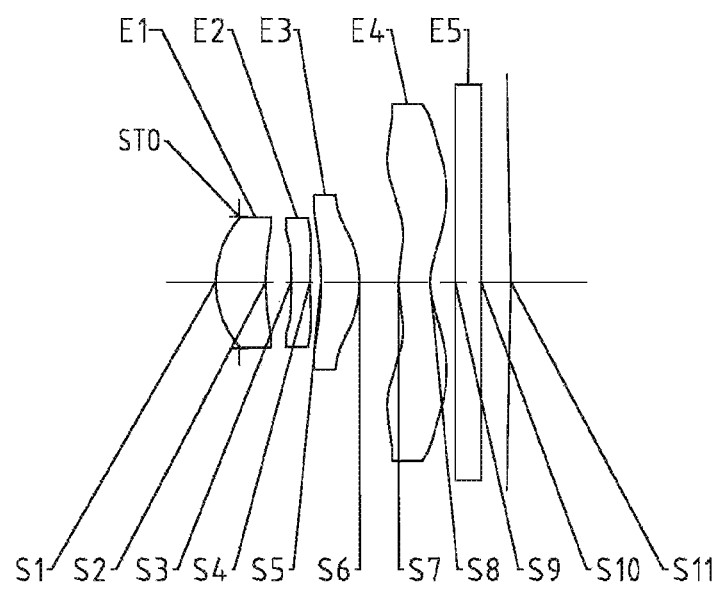
FIG. 3 is a schematic structural diagram illustrating a camera lens assembly according to Embodiment 2 of the present disclosure.

A camera lens assembly according to Embodiment 2 of the present disclosure is described below with reference to FIGS. 3-4D. In the present embodiment and the following embodiments, for the purpose of brevity, the description of parts similar to those in Embodiment 1 will be omitted. FIG. 3 is a schematic structural diagram illustrating the camera lens assembly according to Embodiment 2 of the present disclosure.

As shown in FIG. 3, the camera lens assembly includes, sequentially along the optical axis from the object side to the image side, a first lens E1, a second lens E2, a third lens E3, a fourth lens E4 and an image plane S11. Here, the image plane S11 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a concave surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a concave surface, an image-side surface S6 of the third lens E3 is a convex surface, and the object-side surface S5 and the image-side surface S6 of the third lens E3 are both aspheric surfaces.

The fourth lens E4 has a negative refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

Alternatively, the camera lens assembly may further include an optical filter E5 having an object-side surface S9 and an image-side surface S10. Light from an object sequentially passes through the surfaces S1-S10 and finally forms an image on the image plane S11.

Alternatively, a diaphragm STO for limiting the light beam may be disposed between the object side and the first lens E1, for improving the imaging quality of the camera lens assembly.

In the present embodiment, the fourth lens E4 is the negative lens closest to the image side, and the third lens E3 is the positive lens closest to the image side.

Table 4 shows the surface type, the radius of curvature, the thickness, the material and the conic coefficient of each lens of the camera lens assembly in Embodiment 2. The radius of curvature and the thickness are shown in millimeters (mm). Table 5 shows the high-order coefficients of the aspheric surfaces in Embodiment 2. Here, the surface types of the aspheric surfaces may be defined by the formula (1) given in the above Embodiment 1. Table 6 below shows the effective focal lengths f1-f4 of the lenses in Embodiment 2, the total effective focal length f of the camera lens assembly, the total track length TTL of the camera lens assembly and the half of the maximal field-of-view HFOV of the camera lens assembly.

TABLE 4

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.2714 | | | |
| S1 | aspheric | 1.1751 | 0.5843 | 1.55 | 56.1 | 0.9857 |
| S2 | aspheric | 3.0507 | 0.2980 | | | 8.3284 |

TABLE 4-continued

| surface number | surface type | radius of curvature | thickness | material refractive index | abbe number | conic coefficient |
|---|---|---|---|---|---|---|
| S3 | aspheric | −119.3581 | 0.2208 | 1.67 | 20.4 | 99.0000 |
| S4 | aspheric | 6.1450 | 0.1273 | | | 50.6150 |
| S5 | aspheric | −4.4773 | 0.4497 | 1.55 | 56.1 | −90.4861 |
| S6 | aspheric | −1.4948 | 0.4562 | | | −4.9218 |
| S7 | aspheric | 1.2066 | 0.3679 | 1.55 | 56.1 | −4.6359 |
| S8 | aspheric | 0.7693 | 0.2976 | | | −3.6781 |
| S9 | spherical | infinite | 0.3000 | 1.52 | 64.2 | |
| S10 | spherical | infinite | 0.3483 | | | |
| S11 | spherical | −62.2899 | | | | |

TABLE 5

| surface number | A4 | A6 | A8 | A10 | A12 |
|---|---|---|---|---|---|
| S1 | −2.0401E−01 | 2.4438E+00 | −2.5724E+01 | 1.5854E+02 | −6.1554E+02 |
| S2 | 4.3049E−03 | −1.5059E+00 | 2.3124E+01 | −2.0890E+02 | 1.1310E+03 |
| S3 | −4.1276E−01 | 2.5446E+00 | −4.0011E+01 | 3.2073E+02 | −1.5531E+03 |
| S4 | −2.7704E−01 | 7.7473E−01 | −5.6797E+00 | 2.3376E+01 | −7.1386E+01 |
| S5 | −3.3982E−01 | 1.3402E+00 | −4.1895E+00 | 7.7690E+00 | 8.9480E−01 |
| S6 | −6.0364E−01 | 1.7394E+00 | −6.4392E+00 | 2.2938E+01 | −5.8905E+01 |
| S7 | −8.3299E−01 | 9.5213E−01 | −7.9800E−01 | 5.6145E−01 | −2.9263E−01 |
| S8 | −4.6494E−01 | 5.5834E−01 | −4.8945E−01 | 2.9654E−01 | −1.1873E−01 |

| surface number | A14 | A16 | A18 | A20 |
|---|---|---|---|---|
| S1 | 1.5051E+03 | −2.2524E+03 | 1.8825E+03 | −6.7478E+02 |
| S2 | −3.7726E+03 | 7.5744E+03 | −8.3982E+03 | 3.9487E+03 |
| S3 | 4.4996E+03 | −7.3820E+03 | 5.8793E+03 | −1.3843E+03 |
| S4 | 1.6359E+02 | −2.5190E+02 | 2.2080E+02 | −8.1028E+01 |
| S5 | −3.1778E+01 | 6.2057E+01 | −5.6424E+01 | 2.0990E+01 |
| S6 | 1.0053E+02 | −1.0289E+02 | 5.6032E+01 | −1.2429E+01 |
| S7 | 1.0262E−01 | −2.2618E−02 | 2.8177E−03 | −1.5078E−04 |
| S8 | 2.9739E−02 | −4.2531E−03 | 2.8622E−04 | −4.6651E−06 |

TABLE 6

| parameter | f1(mm) | f2(mm) | f3(mm) | f4(mm) | f(mm) | TTL(mm) | HFOV(°) |
|---|---|---|---|---|---|---|---|
| value | 3.15 | −8.77 | 3.90 | −5.53 | 2.72 | 3.45 | 41.3 |

Figure 4A:
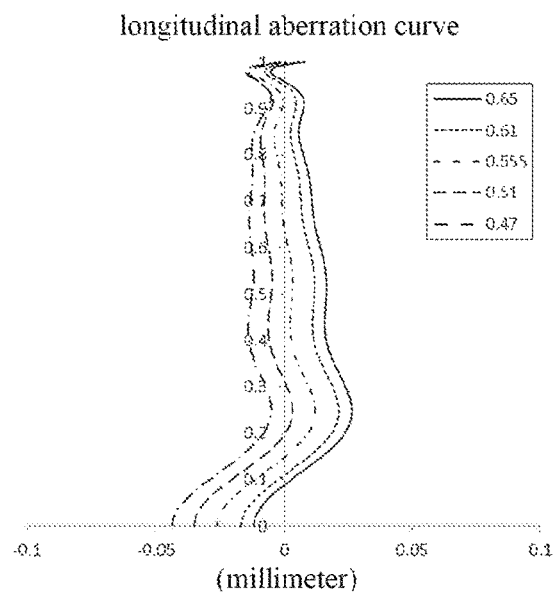
FIGS. 4A-4D respectively illustrate a longitudinal aberration curve, an astigmatic curve, a distortion curve and a lateral color curve of the camera lens assembly according to Embodiment 2.
Figure 4B:
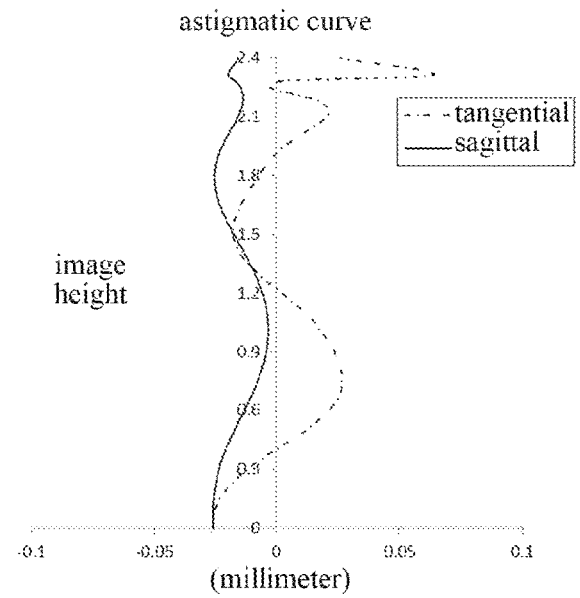
Figure 4C:
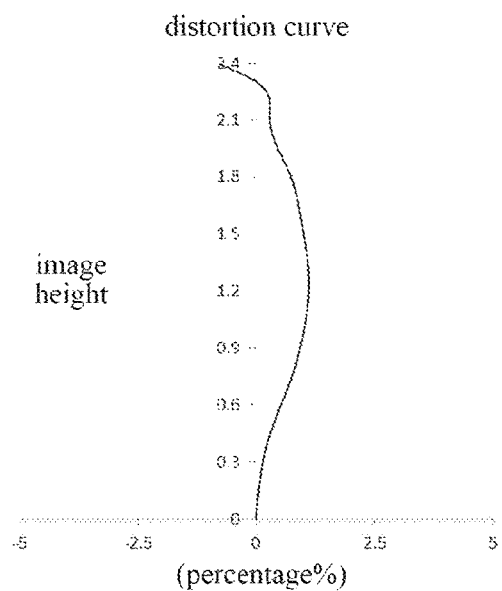
Figure 4D:
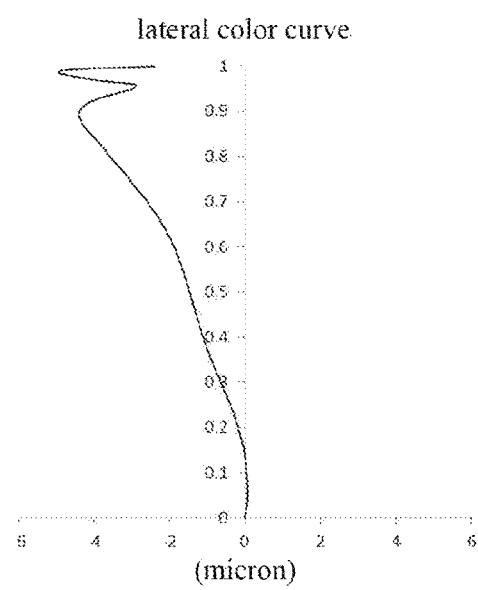

FIG. 4A illustrates the longitudinal aberration curve of the camera lens assembly according to Embodiment 2, representing deviations of focal points of light of different wavelengths converged after passing through the lens assembly. FIG. 4B illustrates the astigmatic curve of the camera lens assembly according to Embodiment 2, representing a curvature of the tangential image plane and a curvature of the sagittal image plane. FIG. 4C illustrates the distortion curve of the camera lens assembly according to Embodiment 2, representing amounts of distortion at different viewing angles. FIG. 4D illustrates the lateral color curve of the camera lens assembly according to Embodiment 2, representing deviations of different image heights on the image plane after light passes through the lens assembly. It can be seen from FIGS. 4A-4D that the camera lens assembly according to Embodiment 2 can achieve a good imaging quality.

Embodiment 3

Figure 5:
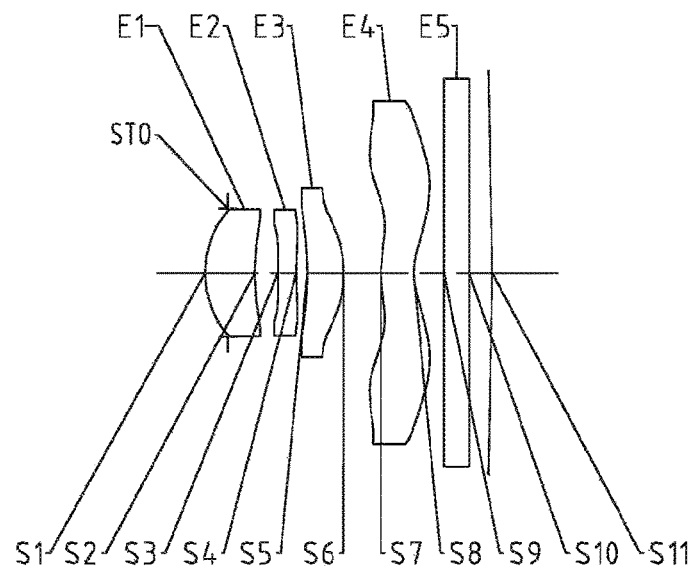
FIG. 5 is a schematic structural diagram illustrating a camera lens assembly according to Embodiment 3 of the present disclosure.

A camera lens assembly according to Embodiment 3 of the present disclosure is described below with reference to FIGS. 5-6D. FIG. 5 is a schematic structural diagram illustrating the camera lens assembly according to Embodiment 3 of the present disclosure.

As shown in FIG. 5, the camera lens assembly includes, sequentially along the optical axis from the object side to the image side, a first lens E1, a second lens E2, a third lens E3, a fourth lens E4 and an image plane S11. Here, the image plane S11 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a concave surface, an image-side surface S6 of the third lens E3 is a convex surface, and the object-side surface S5 and the image-side surface S6 of the third lens E3 are both aspheric surfaces.

The fourth lens E4 has a negative refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

Alternatively, the camera lens assembly may further include an optical filter E5 having an object-side surface S9 and an image-side surface S10. Light from an object sequentially passes through the surfaces S1-S10 and finally forms an image on the image plane S11.

Alternatively, a diaphragm STO for limiting the light beam may be disposed between the object side and the first lens E1, for improving the imaging quality of the camera lens assembly.

In the present embodiment, the fourth lens E4 is the negative lens closest to the image side, and the third lens E3 is the positive lens closest to the image side.

Table 7 shows the surface type, the radius of curvature, the thickness, the material and the conic coefficient of each lens of the camera lens assembly in Embodiment 3. The radius of curvature and the thickness are shown in millimeters (mm). Table 8 shows the high-order coefficients of the aspheric surfaces in Embodiment 3. Here, the surface types of the aspheric surfaces may be defined by the formula (1) given in the above Embodiment 1. Table 9 below shows the effective focal lengths f1-f4 of the lenses in Embodiment 3, the total effective focal length f of the camera lens assembly, the total track length TTL of the camera lens assembly and the half of the maximal field-of-view HFOV of the camera lens assembly.

TABLE 7

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2715 | | | |
| S1 | aspheric | 1.1742 | 0.5964 | 1.55 | 56.1 | 0.9606 |
| S2 | aspheric | 2.9625 | 0.2787 | | | 4.5176 |
| S3 | aspheric | 19.8494 | 0.2200 | 1.67 | 20.4 | −99.0000 |
| S4 | aspheric | 4.7289 | 0.1307 | | | 9.6033 |
| S5 | aspheric | −4.6110 | 0.4446 | 1.55 | 56.1 | −48.1845 |
| S6 | aspheric | −1.5701 | 0.4435 | | | −5.2329 |
| S7 | aspheric | 1.2577 | 0.3959 | 1.55 | 56.1 | −4.2011 |
| S8 | aspheric | 0.8082 | 0.3631 | | | −3.8224 |
| S9 | spherical | infinite | 0.3000 | 1.52 | 64.2 | |
| S10 | spherical | infinite | 0.2772 | | | |
| S11 | spherical | −62.2899 | | | | |

TABLE 8

| surface number | A4 | A6 | A8 | A10 | A12 |
|---|---|---|---|---|---|
| S1 | −2.0799E−01 | 2.5151E+00 | −2.6126E+01 | 1.5880E+02 | −6.0733E+02 |
| S2 | −1.2438E−02 | −3.8291E−01 | 3.7870E+00 | −2.6344E+01 | 1.1138E+02 |
| S3 | −4.1376E−01 | 2.7829E+00 | −4.3964E+01 | 3.5932E+02 | −1.7929E+03 |
| S4 | −2.4784E−01 | 5.8699E−01 | −2.6935E+00 | 6.0090E−01 | 3.2454E+01 |
| S5 | −2.6484E−01 | 8.1007E−01 | 3.6540E−01 | −1.7767E+01 | 9.3578E+01 |
| S6 | −6.3395E−01 | 1.8896E+00 | −7.3391E+00 | 2.7014E+01 | −7.0559E+01 |
| S7 | −8.3833E−01 | 9.6366E−01 | −8.4794E−01 | 6.3885E−01 | −3.5308E−01 |
| S8 | −4.2548E−01 | 4.7815E−01 | −3.9060E−01 | 2.1454E−01 | −7.3373E−02 |

| surface number | A14 | A16 | A18 | A20 |
|---|---|---|---|---|
| S1 | 1.4630E+03 | −2.1579E+03 | 1.7791E+03 | −6.2956E+02 |
| S2 | −3.0523E+02 | 5.2385E+02 | −5.1808E+02 | 2.2498E+02 |
| S3 | 5.4330E+03 | −9.5843E+03 | 8.7582E+03 | −2.9843E+03 |
| S4 | −1.2703E+02 | 2.3616E+02 | −2.3007E+02 | 9.5181E+01 |
| S5 | −2.4461E+02 | 3.5758E+02 | −2.8224E+02 | 9.3712E+01 |
| S6 | 1.2122E+02 | −1.2461E+02 | 6.8249E+01 | −1.5253E+01 |
| S7 | 1.2984E−01 | −2.9836E−02 | 3.8674E−03 | −2.1527E−04 |
| S8 | 1.3381E−02 | −5.8211E−04 | −1.7672E−04 | 2.0295E−05 |

TABLE 9

| parameter | f1(mm) | f2(mm) | f3(mm) | f4(mm) | f(mm) | TTL(mm) | HFOV(°) |
|---|---|---|---|---|---|---|---|
| value | 3.19 | −9.38 | 4.15 | −6.01 | 2.73 | 3.45 | 41.2 |

Figures 6A, 6B:
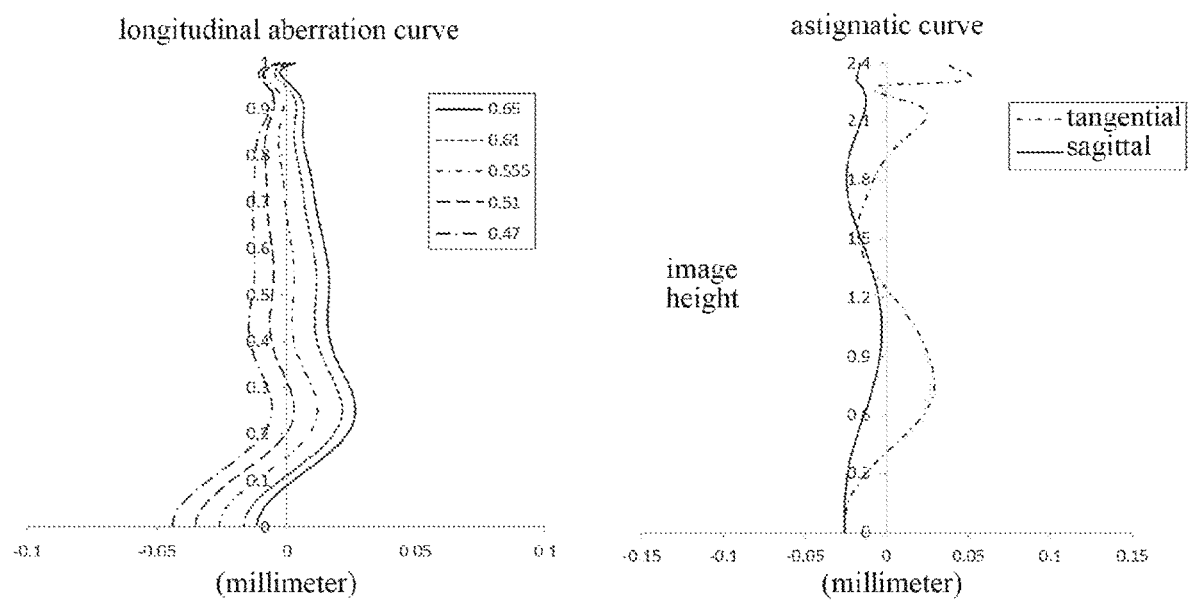
FIGS. 6A-6D respectively illustrate a longitudinal aberration curve, an astigmatic curve, a distortion curve and a lateral color curve of the camera lens assembly according to Embodiment 3.
Figures 6C, 6D:
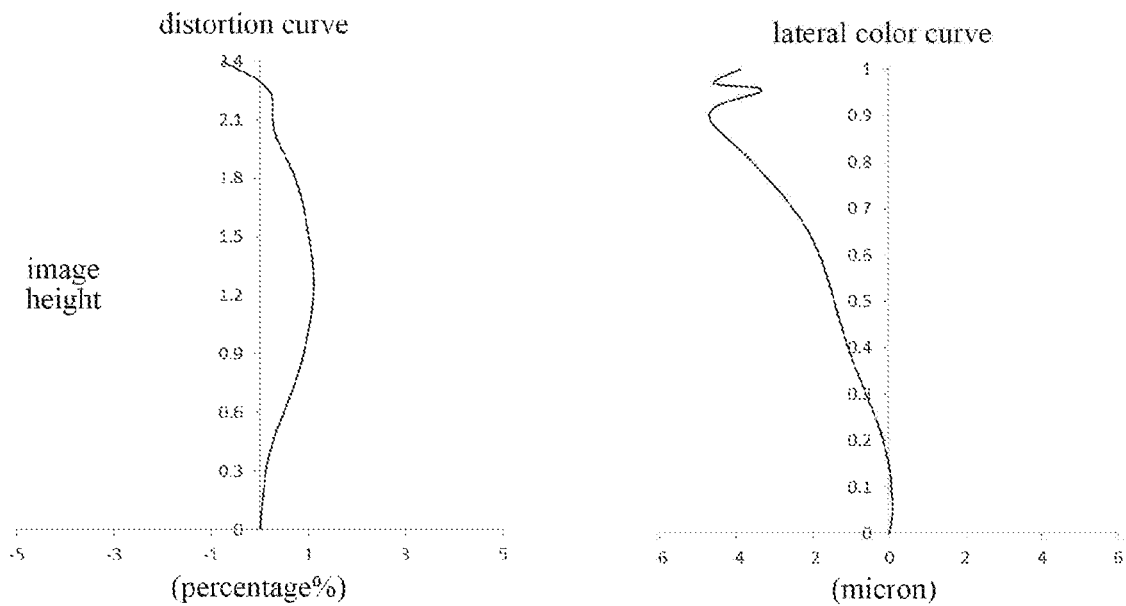

FIG. 6A illustrates the longitudinal aberration curve of the camera lens assembly according to Embodiment 3, representing deviations of focal points of light of different wavelengths converged after passing through the lens assembly. FIG. 6B illustrates the astigmatic curve of the camera lens assembly according to Embodiment 3, representing a curvature of the tangential image plane and a curvature of the sagittal image plane. FIG. 6C illustrates the distortion curve of the camera lens assembly according to Embodiment 3, representing amounts of distortion at different viewing angles. FIG. 6D illustrates the lateral color curve of the camera lens assembly according to Embodiment 3, representing deviations of different image heights on the image plane after light passes through the lens assembly. It can be seen from FIGS. 6A-6D that the camera lens assembly according to Embodiment 3 can achieve a good imaging quality.

Embodiment 4

Figure 7:
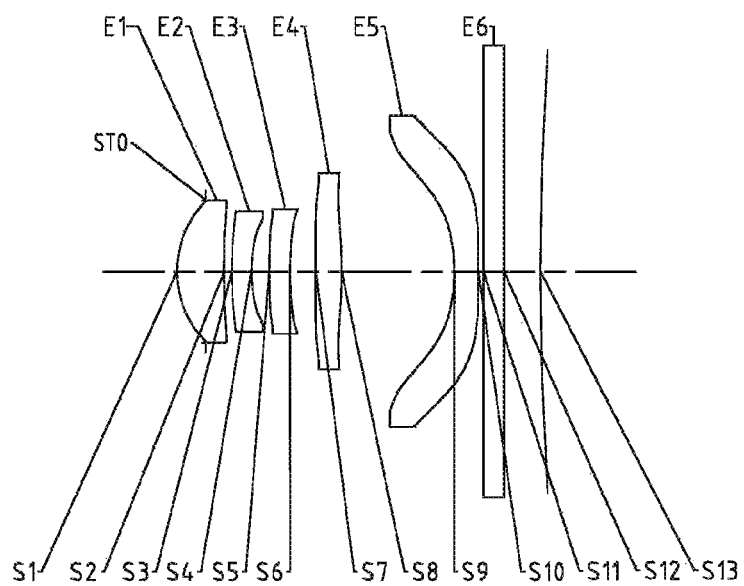
FIG. 7 is a schematic structural diagram illustrating a camera lens assembly according to Embodiment 4 of the present disclosure.

A camera lens assembly according to Embodiment 4 of the present disclosure is described below with reference to FIGS. 7-8D. FIG. 7 is a schematic structural diagram illustrating the camera lens assembly according to Embodiment 4 of the present disclosure.

As shown in FIG. 7, the camera lens assembly includes, sequentially along the optical axis from the object side to the image side, a first lens E1, a second lens E2, a third lens E3, a fourth lens E4, a fifth lens E5 and an image plane S13. Here, the image plane S13 is a curved surface that is convex toward the object side at the paraxial area.

The first lens E1 has a positive refractive power, an object-side surface S1 of the first lens E1 is a convex surface, an image-side surface S2 of the first lens E1 is a convex surface, and the object-side surface S1 and the image-side surface S2 of the first lens E1 are both aspheric surfaces.

The second lens E2 has a negative refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

Alternatively, the camera lens assembly may further include an optical filter E6 having an object-side surface S11 and an image-side surface S12. Light from an object sequentially passes through the surfaces S1-S12 and finally forms an image on the image plane S13.

Alternatively, a diaphragm STO for limiting the light beam may be disposed between the object side and the first lens E1, for improving the imaging quality of the camera lens assembly.

In the present embodiment, the fifth lens E5 is the negative lens closest to the image side, and the fourth lens E4 is the positive lens closest to the image side.

Table 10 shows the surface type, the radius of curvature, the thickness, the material and the conic coefficient of each lens of the camera lens assembly in Embodiment 4. The radius of curvature and the thickness are shown in millimeters (mm). Table 11 shows the high-order coefficients of the aspheric surfaces in Embodiment 4. Here, the surface types of the aspheric surfaces may be defined by the formula (1) given in the above Embodiment 1. Table 12 below shows the effective focal lengths f1-f5 of the lenses in Embodiment 4, the total effective focal length f of the camera lens assembly, the total track length TTL of the camera lens assembly and the half of the maximal field-of-view HFOV of the camera lens assembly.

TABLE 10

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4219 | | | |
| S1 | aspheric | 1.4980 | 0.6897 | 1.54 | 55.9 | −0.1679 |
| S2 | aspheric | −112.2532 | 0.1102 | | | 99.0000 |
| S3 | aspheric | 10.1038 | 0.2850 | 1.67 | 20.4 | 82.0781 |
| S4 | aspheric | 2.1839 | 0.2605 | | | 3.7458 |
| S5 | aspheric | 9.5515 | 0.3000 | 1.55 | 56.1 | 53.9909 |
| S6 | aspheric | 5.4027 | 0.3812 | | | 8.5361 |
| S7 | aspheric | −59.2435 | 0.3753 | 1.67 | 20.4 | 99.0000 |
| S8 | aspheric | −6.6612 | 1.6431 | | | −35.2100 |
| S9 | aspheric | −3.1489 | 0.3490 | 1.54 | 55.9 | −0.2639 |
| S10 | aspheric | 18.3223 | 0.0748 | | | 60.6008 |
| S11 | spherical | infinite | 0.3000 | 1.52 | 64.2 | |
| S12 | spherical | infinite | 0.5312 | | | |
| S13 | spherical | 50.0000 | | | | |

TABLE 11

| surface number | A4 | A6 | A8 | A10 | A12 |
|---|---|---|---|---|---|
| S1 | −1.5443E−03 | 1.3568E−01 | −6.6622E−01 | 2.0385E+00 | −3.9189E+00 |
| S2 | 1.3887E−01 | −4.0125E−01 | 1.4187E+00 | −4.3825E+00 | 9.7998E+00 |
| S3 | 1.0709E−01 | −3.6251E−01 | 7.4871E−01 | −8.3816E−01 | 2.1300E−01 |
| S4 | −1.0296E−02 | −2.4768E−01 | 1.3181E+00 | −5.8273E+00 | 2.2035E+01 |
| S5 | −5.5188E−02 | −1.7168E−02 | 4.5043E−01 | −1.4416E+00 | 4.5200E+00 |
| S6 | 1.0298E−02 | −3.0702E−01 | 2.3762E+00 | −9.5315E+00 | 2.4987E+01 |
| S7 | 4.1838E−03 | 1.3901E−02 | −1.1265E−01 | 3.6148E−01 | −5.1416E−01 |
| S8 | −3.9837E−03 | 3.5370E−02 | −8.3153E−02 | 1.3928E−01 | −1.2319E−01 |
| S9 | −1.3228E−01 | 1.1678E−01 | −1.1912E−01 | 9.7756E−02 | −5.6847E−02 |
| S10 | −1.3815E−01 | 1.0055E−01 | −6.6963E−02 | 2.9015E−02 | −8.1698E−03 |

TABLE 11-continued

| surface number | A14 | A16 | A18 | A20 |
| --- | --- | --- | --- | --- |
| S1 | 4.7932E+00 | −3.6121E+00 | 1.5322E+00 | −2.8070E−01 |
| S2 | −1.4395E+01 | 1.3049E+01 | −6.6181E+00 | 1.4342E+00 |
| S3 | 9.9784E−01 | −1.9762E+00 | 1.6269E+00 | −5.1930E−01 |
| S4 | −5.3967E+01 | 7.9280E+01 | −6.4086E+01 | 2.1942E+01 |
| S5 | −7.9730E+00 | 6.8060E+00 | −2.0444E+00 | −2.0240E−01 |
| S6 | −4.1131E+01 | 4.0797E+01 | −2.2330E+01 | 5.1988E+00 |
| S7 | 4.3760E−01 | −2.3702E−01 | 7.3439E−02 | −9.6025E−03 |
| S8 | 7.8192E−02 | −3.8670E−02 | 1.1506E−02 | −1.3954E−03 |
| S9 | 2.1960E−02 | −5.1636E−03 | 6.6032E−04 | −3.5143E−05 |
| S10 | 1.5052E−03 | −1.8356E−04 | 1.4835E−05 | −6.4184E−07 |

TABLE 12

| parameter | f1 (mm) | f2 (mm) | f3 (mm) | f4 (mm) | f5 (mm) | f (mm) | TTL (mm) | HFOV (°) |
| --- | --- | --- | --- | --- | --- | --- | --- | --- |
| value | 2.76 | −4.25 | −23.38 | 11.24 | −4.98 | 5.56 | 5.30 | 29.2 |

Figure 8A:
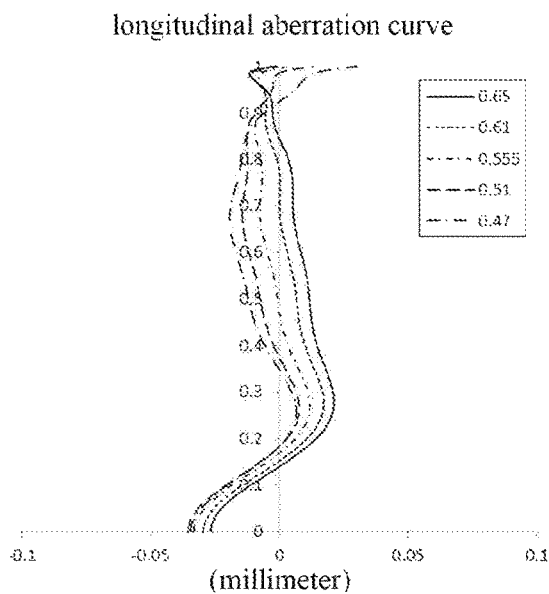
FIGS. 8A-8D respectively illustrate a longitudinal aberration curve, an astigmatic curve, a distortion curve and a lateral color curve of the camera lens assembly according to Embodiment 4.
Figure 8B:
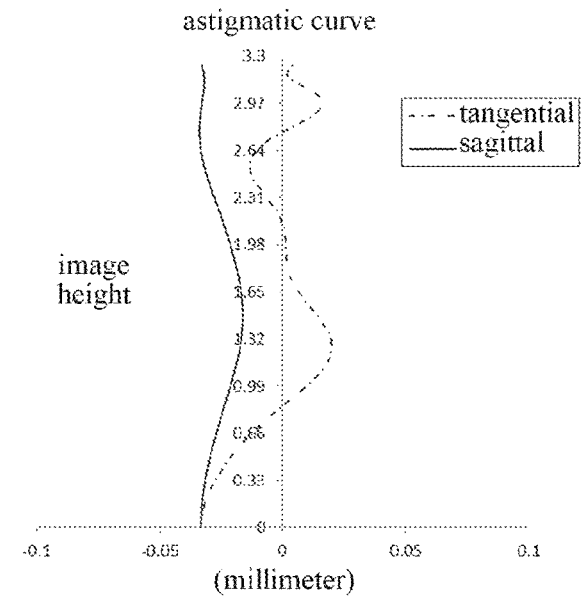
Figure 8C:
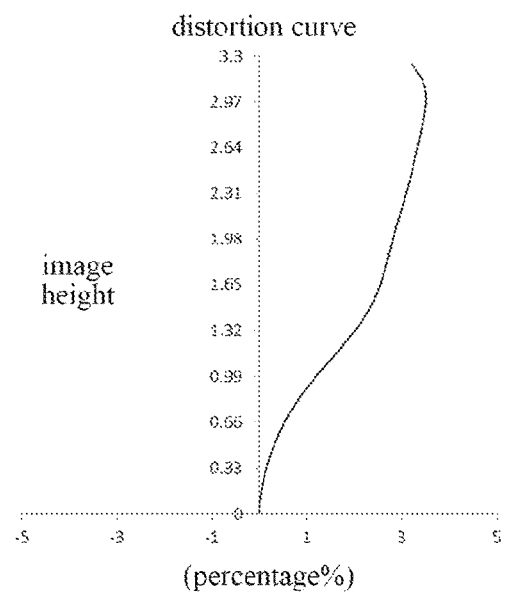
Figure 8D:
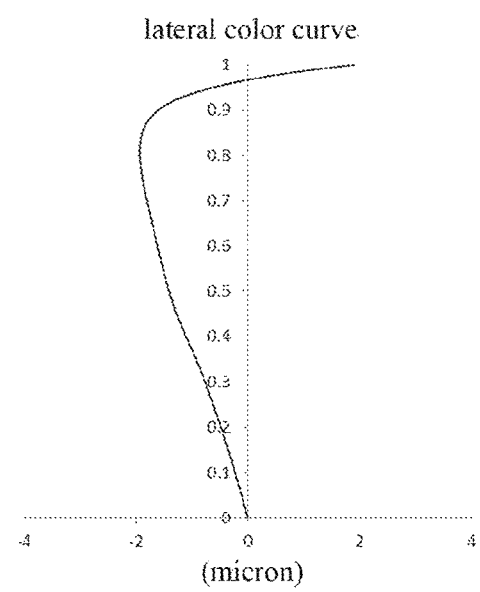

FIG. 8A illustrates the longitudinal aberration curve of the camera lens assembly according to Embodiment 4, representing deviations of focal points of light of different wavelengths converged after passing through the lens assembly. FIG. 8B illustrates the astigmatic curve of the camera lens assembly according to Embodiment 4, representing a curvature of the tangential image plane and a curvature of the sagittal image plane. FIG. 8C illustrates the distortion curve of the camera lens assembly according to Embodiment 4, representing amounts of distortion at different viewing angles. FIG. 8D illustrates the lateral color curve of the camera lens assembly according to Embodiment 4, representing deviations of different image heights on the image plane after light passes through the lens assembly. It can be seen from FIGS. 8A-8D that the camera lens assembly according to Embodiment 4 can achieve a good imaging quality.

Embodiment 5

Figure 9:
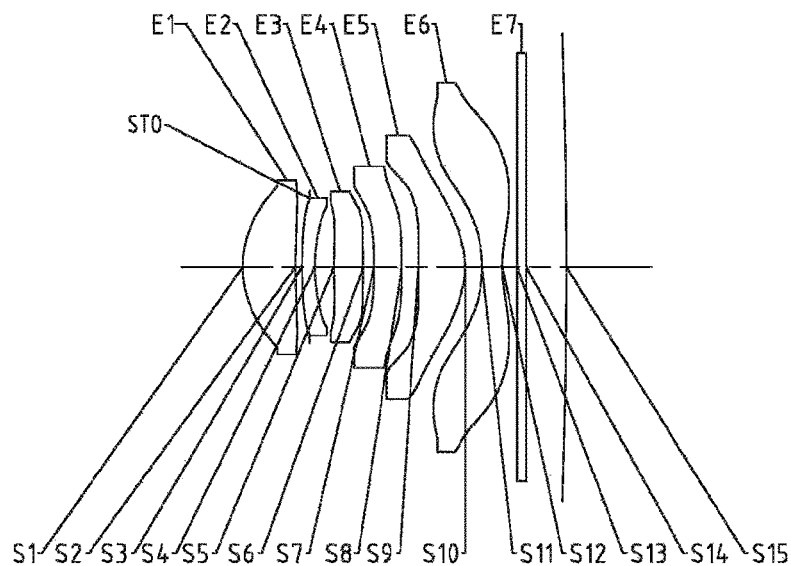
FIG. 9 is a schematic structural diagram illustrating a camera lens assembly according to Embodiment 5 of the present disclosure.

A camera lens assembly according to Embodiment 5 of the present disclosure is described below with reference to FIGS. 9-10D. FIG. 9 is a schematic structural diagram illustrating the camera lens assembly according to Embodiment 5 of the present disclosure.

As shown in FIG. 9, the camera lens assembly includes, sequentially along the optical axis from the object side to the image side, a first lens E1, a second lens E2, a third lens E3, a fourth lens E4, a fifth lens E5, a sixth lens E6 and an image plane S15. Here, the image plane S15 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a negative refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a convex surface, and the object-side surface S9 and the image-side surface S10 of the fifth lens E5 are both aspheric surfaces.

The sixth lens E6 has a negative refractive power, an object-side surface S11 of the sixth lens E6 is a concave surface, an image-side surface S12 of the sixth lens E6 is a concave surface, and the object-side surface S11 and the image-side surface S12 of the sixth lens E6 are both aspheric surfaces.

Alternatively, the camera lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting the light beam may be disposed between the first lens E1 and the second lens E2, for improving the imaging quality of the camera lens assembly.

In the present embodiment, the sixth lens E6 is the negative lens closest to the image side, and the fifth lens E5 is the positive lens closest to the image side.

Table 13 shows the surface type, the radius of curvature, the thickness, the material and the conic coefficient of each lens of the camera lens assembly in Embodiment 5. The radius of curvature and the thickness are shown in millimeters (mm). Table 14 shows the high-order coefficients of the aspheric surfaces in Embodiment 5. Here, the surface types of the aspheric surfaces may be defined by the formula (1) given in the above Embodiment 1. Table 15 below shows the effective focal lengths f1-f6 of the lenses in Embodiment 5, the total effective focal length f of the camera lens assembly, the total track length TTL of the camera lens assembly and the half of the maximal field-of-view HFOV of the camera lens assembly.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5603 | 0.7663 | 1.55 | 56.1 | −0.0623 |
| S2 | aspheric | 8.5880 | 0.2028 | | | −99.0000 |

TABLE 13-continued

| surface number | surface type | radius of curvature | thickness | material refractive index | abbe number | conic coefficient |
|---|---|---|---|---|---|---|
| STO | spherical | infinite | −0.1103 | | | |
| S3 | aspheric | 4.4988 | 0.1900 | 1.67 | 20.4 | −8.6662 |
| S4 | aspheric | 2.4737 | 0.2778 | | | −1.3088 |
| S5 | aspheric | 9.2720 | 0.4261 | 1.54 | 55.9 | −50.9658 |
| S6 | aspheric | 30.9846 | 0.1584 | | | −90.3632 |
| S7 | aspheric | −12.1868 | 0.4104 | 1.67 | 20.4 | −99.0000 |
| S8 | aspheric | −116.3438 | 0.2390 | | | −99.0000 |
| S9 | aspheric | 21.0820 | 0.6838 | 1.55 | 56.1 | −53.8026 |
| S10 | aspheric | −1.2475 | 0.2442 | | | −6.1994 |
| S11 | aspheric | −2.0439 | 0.2950 | 1.54 | 55.9 | −5.7646 |
| S12 | aspheric | 1.8604 | 0.2129 | | | −15.3496 |
| S13 | spherical | infinite | 0.1350 | 1.52 | 64.2 | |
| S14 | spherical | infinite | 0.5836 | | | |
| S15 | spherical | −103.5773 | | | | |

TABLE 14

| surface number | A4 | A6 | A8 | A10 | A12 |
|---|---|---|---|---|---|
| S1 | 2.5438E−04 | −5.0882E−03 | 3.2934E−02 | −1.1438E−01 | 2.2060E−01 |
| S2 | −6.1747E−02 | 1.3976E−01 | −1.4468E−01 | −6.3510E−02 | 3.9667E−01 |
| S3 | −1.4932E−01 | 3.1146E−01 | −4.7608E−02 | −1.2257E+00 | 3.7017E+00 |
| S4 | −9.2734E−02 | 1.7439E−01 | 6.9707E−01 | −5.0302E+00 | 1.6916E+01 |
| S5 | −6.7128E−02 | −1.5636E−01 | 1.4631E+00 | −8.4067E+00 | 2.7987E+01 |
| S6 | −1.2128E−01 | −1.9270E−02 | 2.8799E−01 | −1.6372E+00 | 4.1579E+00 |
| S7 | −2.0856E−01 | 1.9995E−01 | −6.4585E−01 | 1.7352E+00 | −3.0569E+00 |
| S8 | −1.9090E−01 | 1.5493E−01 | −3.1236E−01 | 6.4139E−01 | −8.5804E−01 |
| S9 | −8.9117E−02 | 4.3839E−02 | −2.3339E−01 | 4.6400E−01 | −5.1709E−01 |
| S10 | −8.6223E−02 | 1.4151E−01 | −3.0037E−01 | 3.5985E−01 | −2.4353E−01 |
| S11 | −9.1542E−02 | −6.1740E−02 | 1.0165E−01 | −4.8259E−02 | 1.1941E−02 |
| S12 | −1.0687E−01 | 5.6157E−02 | −2.2433E−02 | 5.7691E−03 | −8.8541E−04 |

| surface number | A14 | A16 | A18 | A20 |
|---|---|---|---|---|
| S1 | −2.6421E−01 | 1.8810E−01 | −7.4067E−02 | 1.2150E−02 |
| S2 | −5.6734E−01 | 4.1986E−01 | −1.6343E−01 | 2.6525E−02 |
| S3 | −5.7670E+00 | 5.2712E+00 | −2.6587E+00 | 5.7577E−01 |
| S4 | −3.4161E+01 | 4.1866E+01 | −2.8650E+01 | 8.4449E+00 |
| S5 | −5.7425E+01 | 7.1003E+01 | −4.8600E+01 | 1.4165E+01 |
| S6 | −6.6343E+00 | 6.5138E+00 | −3.5124E+00 | 7.9728E−01 |
| S7 | 2.8842E+00 | −1.1429E+00 | −7.5519E−03 | 8.3034E−02 |
| S8 | 7.0670E−01 | −3.3768E−01 | 8.5265E−02 | −8.7869E−03 |
| S9 | 3.5387E−01 | −1.5091E−01 | 3.6906E−02 | −3.8923E−03 |
| S10 | 9.8935E−02 | −2.4067E−02 | 3.2357E−03 | −1.8497E−04 |
| S11 | −1.6850E−03 | 1.3033E−04 | −4.4903E−06 | 1.9733E−08 |
| S12 | 5.6429E−05 | 2.8216E−06 | −5.2070E−07 | 1.4461E−08 |

TABLE 15

| parameter | f1 (mm) | f2 (mm) | f3 (mm) | f4 (mm) | f5 (mm) | f6 (mm) | f (mm) | TTL (mm) | HFOV (°) |
|---|---|---|---|---|---|---|---|---|---|
| value | 3.36 | −8.58 | 24.49 | −20.48 | 2.18 | −1.77 | 3.94 | 4.72 | 40.3 |

Figures 10A, 10B:
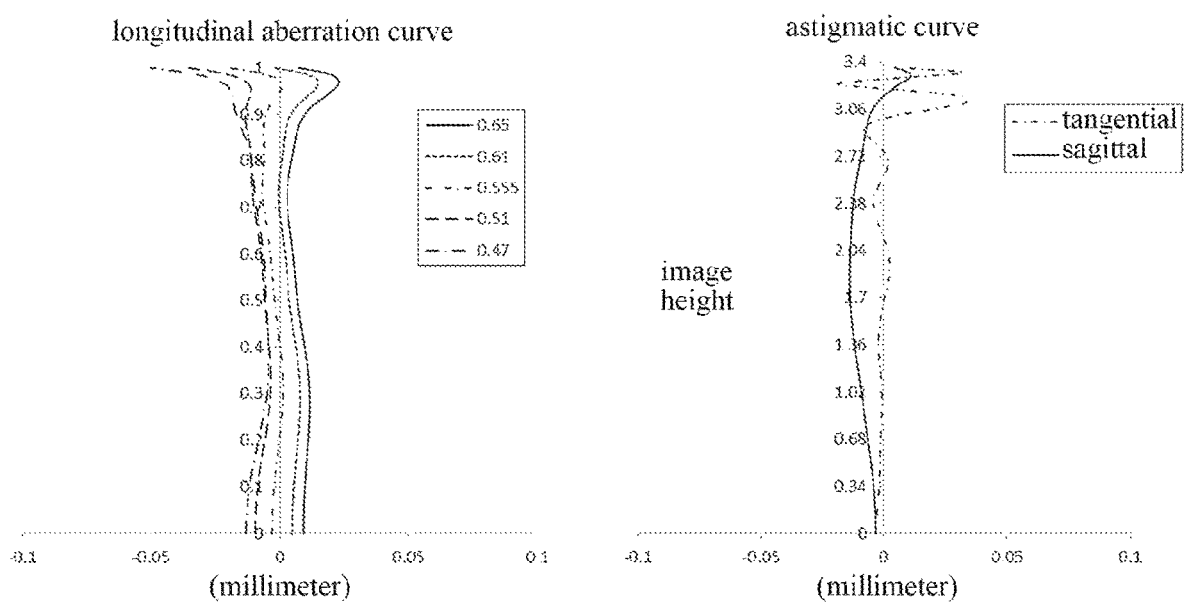
FIGS. 10A-10D respectively illustrate a longitudinal aberration curve, an astigmatic curve, a distortion curve and a lateral color curve of the camera lens assembly according to Embodiment 5.
Figures 10C, 10D:
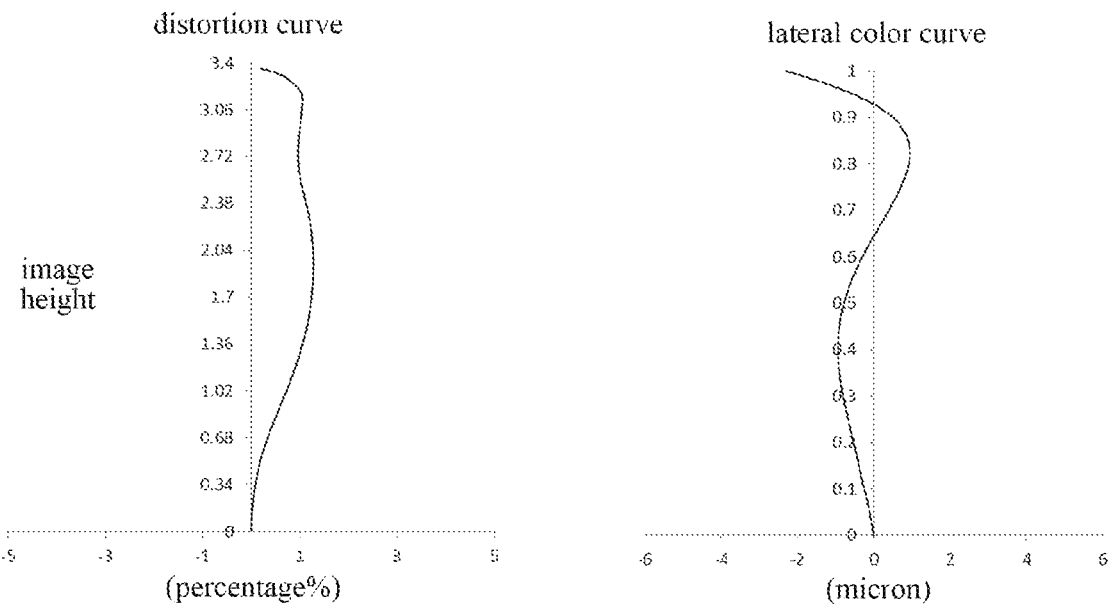

FIG. 10A illustrates the longitudinal aberration curve of the camera lens assembly according to Embodiment 5, representing deviations of focal points of light of different wavelengths converged after passing through the lens assembly. FIG. 10B illustrates the astigmatic curve of the camera lens assembly according to Embodiment 5, representing a curvature of the tangential image plane and a curvature of the sagittal image plane. FIG. 10C illustrates the distortion curve of the camera lens assembly according to Embodiment 5, representing amounts of distortion at different viewing angles. FIG. 10D illustrates the lateral color curve of the camera lens assembly according to Embodiment 5, representing deviations of different image heights on the image plane after light passes through the lens assembly. It can be seen from FIGS. 10A-10D that the camera lens assembly according to Embodiment 5 can achieve a good imaging quality.

Embodiment 6

Figure 11:
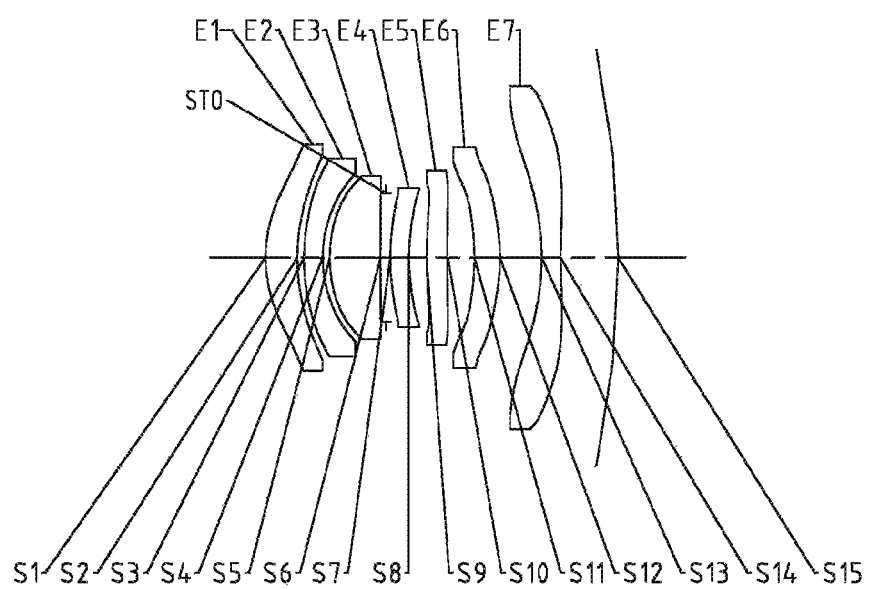
FIG. 11 is a schematic structural diagram illustrating a camera lens assembly according to Embodiment 6 of the present disclosure.

A camera lens assembly according to Embodiment 6 of the present disclosure is described below with reference to FIGS. 11-12D. FIG. 11 is a schematic structural diagram illustrating the camera lens assembly according to Embodiment 6 of the present disclosure.

As shown in FIG. 11, the camera lens assembly includes, sequentially along the optical axis from the object side to the image side, a first lens E1, a second lens E2, a third lens E3, a fourth lens E4, a fifth lens E5, a sixth lens E6, a seventh lens E7 and an image plane S15. Here, the image plane S15 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Light from an object sequentially passes through the surfaces S1-S14 and finally forms an image on the image plane S15.

Alternatively, a diaphragm STO for limiting the light beam may be disposed between the third lens E3 and the fourth lens E4, for improving the imaging quality of the camera lens assembly.

In the present embodiment, the seventh lens E7 is the negative lens closest to the image side, and the sixth lens E6 is the positive lens closest to the image side.

Table 16 shows the surface type, the radius of curvature, the thickness, the material and the conic coefficient of each lens of the camera lens assembly in Embodiment 6. The radius of curvature and the thickness are shown in millimeters (mm). Table 17 shows the high-order coefficients of the aspheric surfaces in Embodiment 6. Here, the surface types of the aspheric surfaces may be defined by the formula (1) given in the above Embodiment 1. Table 18 below shows the effective focal lengths f1-f7 of the lenses in Embodiment 6, the total effective focal length f of the camera lens assembly, the total track length TTL of the camera lens assembly and the half of the maximal field-of-view HFOV of the camera lens assembly.

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7842 | 0.4239 | 1.55 | 56.1 | −0.4966 |
| S2 | aspheric | 2.7188 | 0.0881 | | | 0.1104 |
| S3 | aspheric | 2.7472 | 0.2500 | 1.67 | 20.4 | −0.6144 |
| S4 | aspheric | 1.6688 | 0.0948 | | | 0.1867 |
| S5 | aspheric | 1.9058 | 0.6759 | 1.55 | 56.1 | 0.7796 |
| S6 | aspheric | 20.3756 | 0.0752 | | | 99.0000 |
| STO | spherical | infinite | 0.0546 | | | 0.0000 |
| S7 | aspheric | 2.8196 | 0.2500 | 1.67 | 20.4 | −28.8441 |
| S8 | aspheric | 2.7317 | 0.2342 | | | −5.0378 |
| S9 | aspheric | 6.0521 | 0.2759 | 1.54 | 55.9 | 8.6447 |
| S10 | aspheric | 48.9534 | 0.3617 | | | 99.0000 |
| S11 | aspheric | −3.6365 | 0.3410 | 1.64 | 23.5 | 5.6955 |
| S12 | aspheric | −2.6315 | 0.5560 | | | 1.0326 |
| S13 | aspheric | −3.5753 | 0.2500 | 1.54 | 55.9 | −2.3127 |
| S14 | aspheric | 5.6206 | 0.7686 | | | −99.0000 |
| S15 | spherical | −13.2238 | | | | |

TABLE 17

| surface number | A4 | A6 | A8 | A10 | A12 |
|---|---|---|---|---|---|
| S1 | −2.4761E−02 | 6.7604E−02 | −1.9778E−01 | 2.9814E−01 | −2.7212E−01 |
| S2 | −4.8909E−02 | 3.4327E−01 | −1.2704E+00 | 2.5694E+00 | −3.0450E+00 |
| S3 | −3.4014E−02 | 3.5189E−01 | −1.5608E+00 | 3.5408E+00 | −4.6128E+00 |

TABLE 17-continued

| | | | | | |
|---|---|---|---|---|---|
| S4 | −1.5054E−02 | 4.1234E−01 | −2.7283E+00 | 8.4219E+00 | −1.5084E+01 |
| S5 | 3.8740E−02 | 3.4560E−02 | −5.4067E−01 | 2.1344E+00 | −4.5283E+00 |
| S6 | −1.2455E−01 | 5.1992E−01 | −2.1715E+00 | 7.1706E+00 | −1.5968E+01 |
| S7 | 1.8421E−02 | −2.6773E−01 | 2.5990E+00 | −1.1821E+01 | 3.3123E+01 |
| S8 | −1.2326E−01 | 7.5280E−01 | −4.7027E+00 | 2.1172E+01 | −5.9726E+01 |
| S9 | −5.3598E−02 | 8.8851E−02 | −4.6941E−01 | 1.8891E+00 | −4.7181E+00 |
| S10 | 1.3660E−02 | −1.8534E−02 | 4.0463E−03 | 1.4595E−01 | −3.8030E−01 |
| S11 | 1.2092E−01 | −7.3231E−01 | 2.8777E+00 | −7.2424E+00 | 1.1191E+01 |
| S12 | 1.3134E−01 | −2.5651E−01 | 6.1751E−01 | −1.0966E+00 | 1.1943E+00 |
| S13 | −5.5993E−02 | 8.0402E−02 | −4.0809E−02 | −2.3328E−03 | 1.0697E−02 |
| S14 | −9.3867E−02 | 9.0935E−02 | −6.9225E−02 | 3.6165E−02 | −1.3075E−02 |

| surface number | A14 | A16 | A18 | A20 |
|---|---|---|---|---|
| S1 | 1.4657E−01 | −4.5014E−02 | 7.1938E−03 | −4.5357E−04 |
| S2 | 2.1691E+00 | −9.1395E−01 | 2.0979E−01 | −2.0202E−02 |
| S3 | 3.6214E+00 | −1.6942E+00 | 4.3476E−01 | −4.7067E−02 |
| S4 | 1.6582E+01 | −1.0978E+01 | 4.0024E+00 | −6.1704E−01 |
| S5 | 5.8873E+00 | −4.6061E+00 | 1.9964E+00 | −3.7381E−01 |
| S6 | 2.2818E+01 | −1.9909E+01 | 9.5852E+00 | −1.9429E+00 |
| S7 | −5.8761E+01 | 6.3991E+01 | −3.8934E+01 | 1.0067E+01 |
| S8 | 1.0491E+02 | −1.1170E+02 | 6.6059E+01 | −1.6681E+01 |
| S9 | 6.6041E+00 | −5.1481E+00 | 2.0004E+00 | −2.8019E−01 |
| S10 | 3.5088E−01 | −1.4450E−01 | 2.5309E−02 | −1.3810E−03 |
| S11 | −1.0687E+01 | 6.1360E+00 | −1.9272E+00 | 2.5290E−01 |
| S12 | −8.0072E−01 | 3.2476E−01 | −7.2630E−02 | 6.8250E−03 |
| S13 | −4.4160E−03 | 8.1367E−04 | −7.0342E−05 | 2.2265E−06 |
| S14 | 3.1403E−03 | −4.6390E−04 | 3.7358E−05 | −1.2399E−06 |

TABLE 18

| parameter | f1 (mm) | f2 (mm) | f3 (mm) | f4 (mm) | f5 (mm) | f6 (mm) | f7 (mm) | f (mm) | TTL (mm) | HFOV (°) |
|---|---|---|---|---|---|---|---|---|---|---|
| value | 8.19 | −7.03 | 3.80 | 953.58 | 12.83 | 13.04 | −4.03 | 4.03 | 4.70 | 37.1 |

Figure 12A:
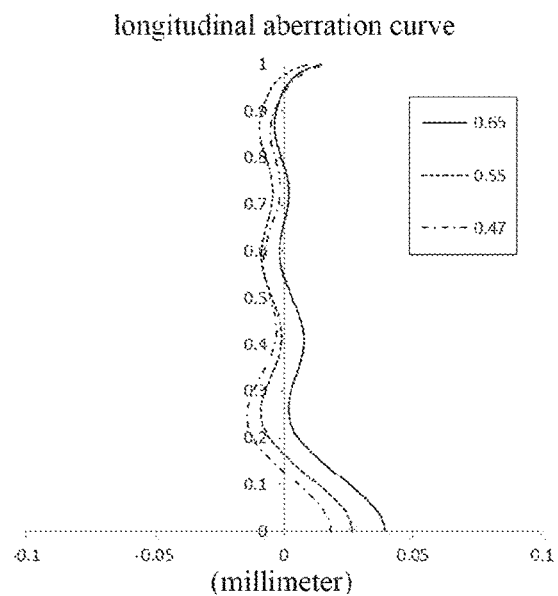
FIGS. 12A-12D respectively illustrate a longitudinal aberration curve, an astigmatic curve, a distortion curve and a lateral color curve of the camera lens assembly according to Embodiment 6.
Figure 12B:
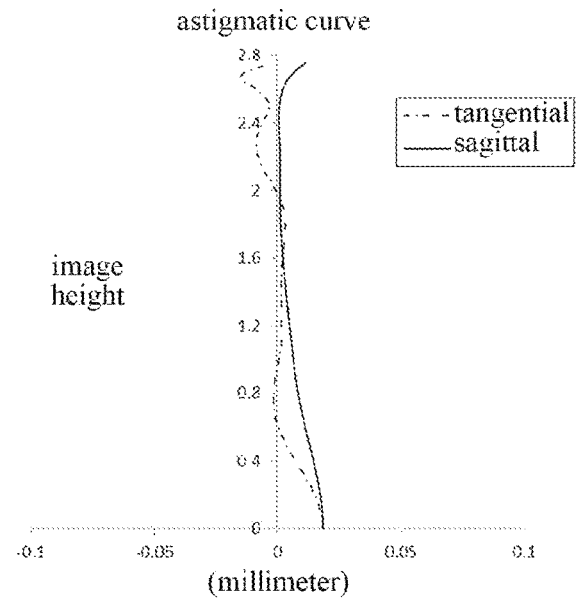
Figure 12C:
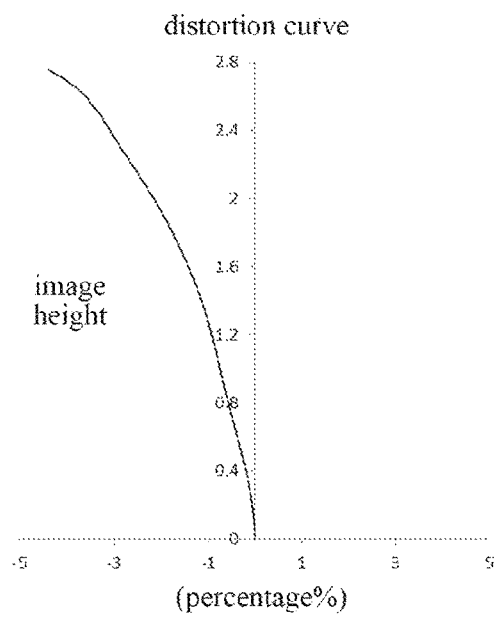
Figure 12D:
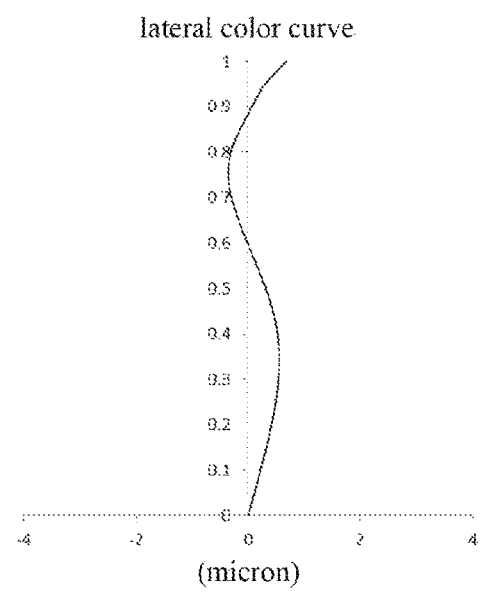

FIG. 12A illustrates the longitudinal aberration curve of the camera lens assembly according to Embodiment 6, representing deviations of focal points of light of different wavelengths converged after passing through the lens assembly. FIG. 12B illustrates the astigmatic curve of the camera lens assembly according to Embodiment 6, representing a curvature of the tangential image plane and a curvature of the sagittal image plane. FIG. 12C illustrates the distortion curve of the camera lens assembly according to Embodiment 6, representing amounts of distortion at different viewing angles. FIG. 12D illustrates the lateral color curve of the camera lens assembly according to Embodiment 6, representing deviations of different image heights on the image plane after light passes through the lens assembly. It can be seen from FIGS. 12A-12D that the camera lens assembly according to Embodiment 6 can achieve a good imaging quality.

Embodiment 7

Figure 13:
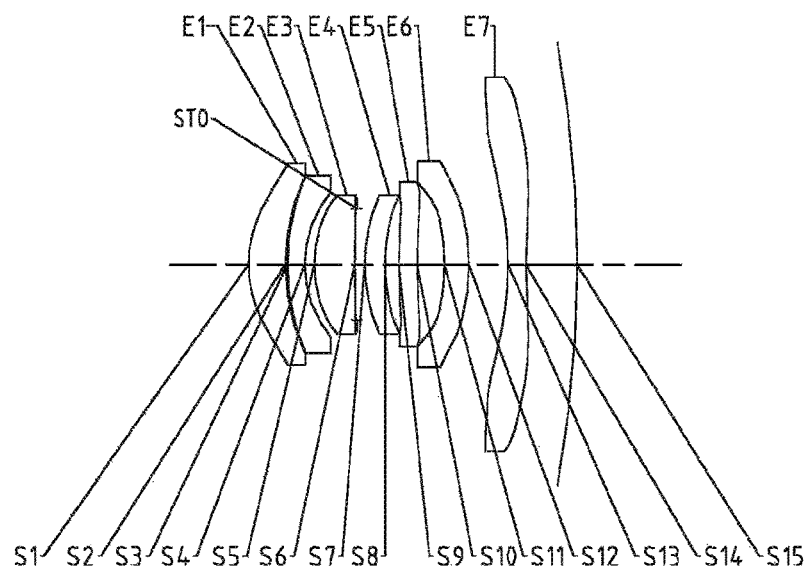
FIG. 13 is a schematic structural diagram illustrating a camera lens assembly according to Embodiment 7 of the present disclosure.

A camera lens assembly according to Embodiment 7 of the present disclosure is described below with reference to FIGS. 13-14D. FIG. 13 is a schematic structural diagram illustrating the camera lens assembly according to Embodiment 7 of the present disclosure.

As shown in FIG. 13, the camera lens assembly includes, sequentially along the optical axis from the object side to the image side, a first lens E1, a second lens E2, a third lens E3, a fourth lens E4, a fifth lens E5, a sixth lens E6, a seventh lens E7 and an image plane S15. Here, the image plane S15 is a curved surface that is convex toward the image side at the paraxial area.

The first lens E1 has a positive refractive power, an object-side surface S1 of the first lens E1 is a convex surface, an image-side surface S2 of the first lens E1 is a concave surface, the object-side surface S1 of the first lens E1 is an aspheric surface, and the image-side surface S2 is a spherical surface.

The second lens E2 has a negative refractive power, an object-side surface S3 of the second lens E2 is a convex surface, an image-side surface S4 of the second lens E2 is a concave surface, the object-side surface S3 of the second lens E2 is a spherical surface, and the image-side surface S4 is a aspheric surface.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Light from an object sequentially passes through the surfaces S1-S14 and finally forms an image on the image plane S15.

Alternatively, a diaphragm STO for limiting the light beam may be disposed between the third lens E3 and the fourth lens E4, for improving the imaging quality of the camera lens assembly.

In the present embodiment, the seventh lens E7 is the negative lens closest to the image side, and the sixth lens E6 is the positive lens closest to the image side.

Table 19 shows the surface type, the radius of curvature, the thickness, the material and the conic coefficient of each lens of the camera lens assembly in Embodiment 7. The radius of curvature and the thickness are shown in millimeters (mm). Table 20 shows the high-order coefficients of the aspheric surfaces in Embodiment 7. Here, the surface types of the aspheric surfaces may be defined by the formula (1) given in the above Embodiment 1. Table 21 below shows the effective focal lengths f1-f7 of the lenses in Embodiment 7, the total effective focal length f of the camera lens assembly, the total track length TTL of the camera lens assembly and the half of the maximal field-of-view HFOV of the camera lens assembly.

TABLE 19

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.6869 | 0.5260 | 1.55 | 56.1 | −0.3965 |
| S2 | spherical | 2.9680 | 0.0297 | | | 0 |
| S3 | spherical | 3.2349 | 0.2500 | 1.67 | 20.4 | 0 |
| S4 | aspheric | 1.6490 | 0.1363 | | | 0.2145 |
| S5 | aspheric | 1.9157 | 0.5766 | 1.55 | 56.1 | 0.4942 |
| S6 | aspheric | 11.7452 | 0.0300 | | | 97.9878 |
| STO | spherical | infinite | 0.1134 | | | |
| S7 | aspheric | 2.2366 | 0.2883 | 1.67 | 20.4 | −13.3484 |
| S8 | aspheric | 2.5973 | 0.2085 | | | −0.2711 |
| S9 | aspheric | 6.6434 | 0.2613 | 1.54 | 55.9 | 0.0000 |
| S10 | aspheric | 9.8334 | 0.3889 | | | 0.0000 |
| S11 | aspheric | −3.8241 | 0.3514 | 1.64 | 23.5 | 5.1328 |
| S12 | aspheric | −2.9042 | 0.5570 | | | 1.0556 |
| S13 | aspheric | −4.7264 | 0.2539 | 1.54 | 55.9 | −44.6756 |
| S14 | aspheric | 6.1933 | 0.7343 | | | −10.8510 |
| S15 | spherical | −18.0120 | | | | |

TABLE 20

| surface number | A4 | A6 | A8 | A10 | A12 | A14 |
|---|---|---|---|---|---|---|
| S1 | −6.3418E−03 | −5.6284E−03 | 4.1245E−04 | −4.9125E−03 | 1.6688E−03 | −9.7437E−05 |
| S4 | −2.9490E−03 | 1.4328E−02 | −3.3927E−02 | 1.5282E−02 | 5.2324E−03 | −6.2989E−03 |
| S5 | 8.8598E−03 | 1.9574E−02 | 7.5414E−03 | 1.9384E−03 | 8.8337E−04 | 5.3131E−03 |
| S6 | −1.0295E−01 | 8.3967E−02 | 6.3722E−02 | −2.4983E−01 | 2.7267E−01 | −9.7705E−02 |
| S7 | 6.8622E−02 | −8.0925E−02 | 2.4971E−01 | −3.5454E−01 | 2.9038E−01 | −1.1816E−01 |
| S8 | −1.0859E−02 | 1.7080E−03 | 5.1104E−02 | 1.8242E−03 | −9.9750E−03 | −8.5217E−03 |
| S9 | −1.7438E−02 | −1.3524E−02 | −2.3828E−02 | 8.9878E−04 | −9.1488E−03 | −5.3090E−04 |
| S10 | 6.6576E−03 | −1.7142E−02 | 2.5956E−03 | −5.6638E−03 | −5.0675E−03 | 2.0086E−03 |
| S11 | −1.7740E−02 | −6.4845E−02 | −3.8382E−02 | 4.3057E−02 | −1.5270E−02 | 7.5809E−03 |
| S12 | 5.9711E−02 | −6.4016E−02 | 5.2878E−03 | 5.9276E−03 | 2.6254E−03 | −1.1689E−03 |
| S13 | −3.2252E−02 | 8.7155E−03 | −1.9903E−04 | −9.3195E−05 | 2.1947E−06 | 4.0619E−07 |
| S14 | −4.8739E−02 | 1.1685E−02 | −1.3801E−03 | −3.2460E−05 | 2.9013E−05 | −2.2785E−06 |

TABLE 21

| parameter | f1 (mm) | f2 (mm) | f3 (mm) | f4 (mm) | f5 (mm) | f6 (mm) | f7 (mm) | f (mm) | TTL (mm) | HFOV (°) |
|---|---|---|---|---|---|---|---|---|---|---|
| value | 6.25 | −5.38 | 4.11 | 18.31 | 37.08 | 16.30 | −4.95 | 4.03 | 4.71 | 37.1 |

Figures 14A, 14B:
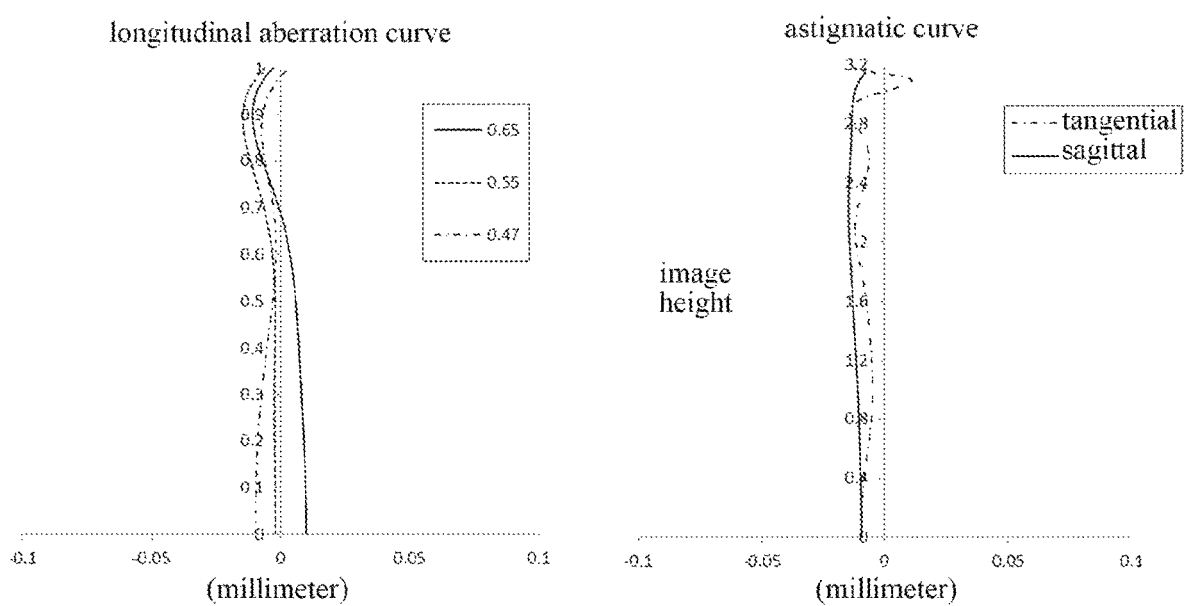
FIGS. 14A-14D respectively illustrate a longitudinal aberration curve, an astigmatic curve, a distortion curve and a lateral color curve of the camera lens assembly according to Embodiment 7.
Figures 14C, 14D:
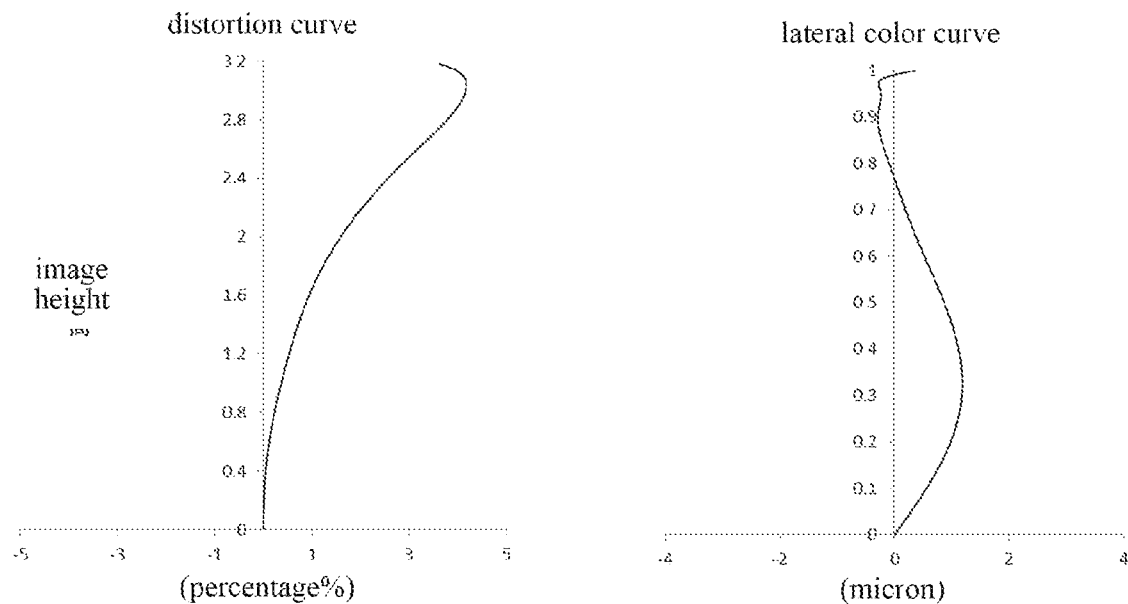

FIG. 14A illustrates the longitudinal aberration curve of the camera lens assembly according to Embodiment 7, representing deviations of focal points of light of different wavelengths converged after passing through the lens assembly. FIG. 14B illustrates the astigmatic curve of the camera lens assembly according to Embodiment 7, representing a curvature of the tangential image plane and a curvature of the sagittal image plane. FIG. 14C illustrates the distortion curve of the camera lens assembly according to Embodiment 7, representing amounts of distortion at different viewing angles. FIG. 14D illustrates the lateral color curve of the camera lens assembly according to Embodiment 7, representing deviations of different image heights on the image plane after light passes through the lens assembly. It can be seen from FIGS. 14A-14D that the camera lens assembly according to Embodiment 7 can achieve a good imaging quality.

Embodiment 8

Figure 15:
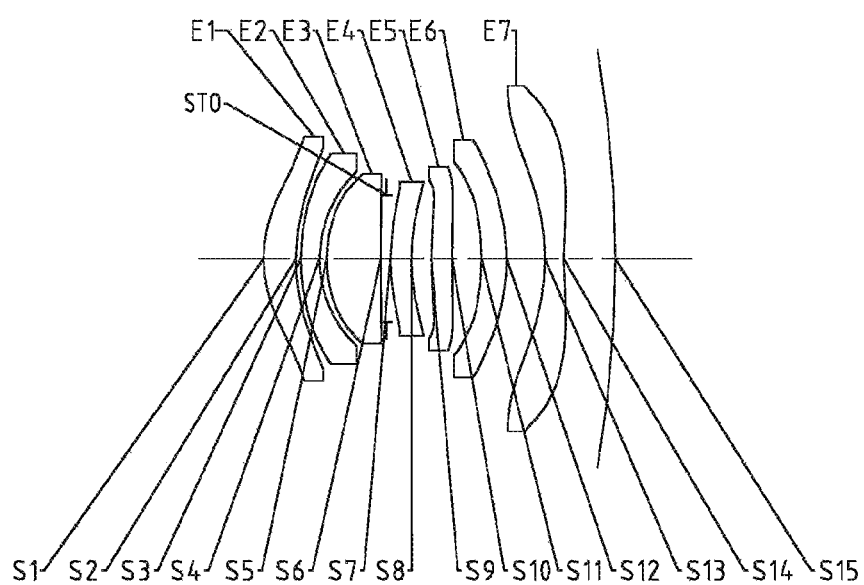
FIG. 15 is a schematic structural diagram illustrating a camera lens assembly according to Embodiment 8 of the present disclosure.

A camera lens assembly according to Embodiment 8 of the present disclosure is described below with reference to FIGS. 15-16D. FIG. 15 is a schematic structural diagram illustrating the camera lens assembly according to Embodiment 8 of the present disclosure.

As shown in FIG. 15, the camera lens assembly includes, sequentially along the optical axis from the object side to the image side, a first lens E1, a second lens E2, a third lens E3, a fourth lens E4, a fifth lens E5, a sixth lens E6, a seventh lens E7 and an image plane S15. Here, the image plane S15 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Light from an object sequentially passes through the surfaces S1-S14 and finally forms an image on the image plane S15.

Alternatively, a diaphragm STO for limiting the light beam may be disposed between the third lens E3 and the fourth lens E4, for improving the imaging quality of the camera lens assembly.

In the present embodiment, the seventh lens E7 is the negative lens closest to the image side, and the sixth lens E6 is the positive lens closest to the image side.

Table 22 shows the surface type, the radius of curvature, the thickness, the material and the conic coefficient of each lens of the camera lens assembly in Embodiment 8. The radius of curvature and the thickness are shown in millimeters (mm). Table 23 shows the high-order coefficients of the aspheric surfaces in Embodiment 8. Here, the surface types of the aspheric surfaces may be defined by the formula (1) given in the above Embodiment 1. Table 24 below shows the effective focal lengths f1-f7 of the lenses in Embodiment 8, the total effective focal length f of the camera lens assembly, the total track length TTL of the camera lens assembly and the half of the maximal field-of-view HFOV of the camera lens assembly.

TABLE 22

| surface number | surface type | radius of curvature | thickness | material refractive index | abbe number | conic coefficient |
| --- | --- | --- | --- | --- | --- | --- |
| OBJ | spherical | infinite | infinite | | | |
| S1 | aspheric | 1.7817 | 0.4319 | 1.55 | 56.1 | −0.4860 |
| S2 | aspheric | 2.7922 | 0.0633 | | | −0.4933 |
| S3 | aspheric | 2.7899 | 0.2500 | 1.67 | 20.4 | −0.2473 |
| S4 | aspheric | 1.6438 | 0.0980 | | | 0.1883 |
| S5 | aspheric | 1.8830 | 0.7236 | 1.55 | 56.1 | 0.5286 |
| S6 | aspheric | 14.0609 | 0.0767 | | | 95.7700 |
| STO | spherical | infinite | 0.0500 | | | |
| S7 | aspheric | 2.6328 | 0.2816 | 1.67 | 20.4 | −24.8214 |
| S8 | aspheric | 2.6822 | 0.2650 | | | −4.2782 |
| S9 | aspheric | 5.9501 | 0.2779 | 1.54 | 55.9 | 8.2946 |
| S10 | aspheric | 45.4736 | 0.3940 | | | −99.0000 |
| S11 | aspheric | −3.4260 | 0.3373 | 1.64 | 23.5 | 5.9523 |
| S12 | aspheric | −2.4134 | 0.5106 | | | 1.0047 |
| S13 | aspheric | −3.2646 | 0.2500 | 1.54 | 55.9 | −1.7611 |
| S14 | aspheric | 4.4225 | 0.6899 | | | −99.0000 |
| S15 | spherical | −16.6559 | | | | |

TABLE 23

| surface number | A4 | A6 | A8 | A10 | A12 |
|---|---|---|---|---|---|
| S1 | −1.7620E−02 | 2.7191E−02 | −9.9288E−02 | 1.6264E−01 | −1.6476E−01 |
| S2 | −1.3261E−02 | 6.8977E−02 | −2.4865E−01 | 5.1443E−01 | −6.3678E−01 |
| S3 | 1.9877E−03 | 1.1964E−02 | −1.2469E−01 | 3.2933E−01 | −4.4100E−01 |
| S4 | 3.3235E−02 | −2.3664E−01 | 6.8995E−01 | −1.1883E+00 | 9.7290E−01 |
| S5 | 6.2458E−02 | −3.9231E−01 | 1.7796E+00 | −4.5885E+00 | 7.2641E+00 |
| S6 | −1.4310E−01 | 5.7902E−01 | −2.5793E+00 | 8.5694E+00 | −1.8476E+01 |
| S7 | 7.0629E−02 | −5.6582E−01 | 3.5191E+00 | −1.2742E+01 | 2.8952E+01 |
| S8 | −4.7559E−02 | 8.5584E−02 | −2.6545E−01 | 1.2293E+00 | −3.0719E+00 |
| S9 | −6.4389E−03 | −1.6981E−01 | 5.8745E−01 | −1.5775E+00 | 2.7165E+00 |
| S10 | 3.5100E−02 | −9.3674E−02 | 1.3566E−01 | −1.4809E−01 | 7.3876E−02 |
| S11 | 7.4503E−02 | −2.6636E−01 | 6.4741E−01 | −1.3070E+00 | 1.7364E+00 |
| S12 | 1.2464E−01 | −1.4700E−01 | 1.8122E−01 | −2.2332E−01 | 1.8124E−01 |
| S13 | −5.8137E−02 | 1.0569E−01 | −1.0091E−01 | 5.5989E−02 | −1.8309E−02 |
| S14 | −7.5646E−02 | 6.1669E−02 | −4.1405E−02 | 1.7457E−02 | −4.5437E−03 |

| surface number | A14 | A16 | A18 | A20 |
|---|---|---|---|---|
| S1 | 9.8961E−02 | −3.4571E−02 | 6.5346E−03 | −5.1777E−04 |
| S2 | 4.7537E−01 | −2.0995E−01 | 5.0433E−02 | −5.0647E−03 |
| S3 | 3.5009E−01 | −1.6576E−01 | 4.3105E−02 | −4.7301E−03 |
| S4 | 1.0530E−01 | −8.2863E−01 | 5.7377E−01 | −1.2976E−01 |
| S5 | −7.0353E+00 | 4.0442E+00 | −1.2555E+00 | 1.5812E−01 |
| S6 | 2.5189E+01 | −2.0916E+01 | 9.5757E+00 | −1.8348E+00 |
| S7 | −4.1286E+01 | 3.5535E+01 | −1.6752E+01 | 3.2627E+00 |
| S8 | 4.3413E+00 | −3.5117E+00 | 1.4830E+00 | −2.5350E−01 |
| S9 | −3.1385E+00 | 2.3259E+00 | −1.0191E+00 | 2.0011E−01 |
| S10 | 9.0170E−03 | −3.6586E−02 | 1.8576E−02 | −2.7809E−03 |
| S11 | −1.4817E+00 | 8.1856E−01 | −2.6709E−01 | 3.8620E−02 |
| S12 | −8.2442E−02 | 2.0567E−02 | −2.5952E−03 | 1.1958E−04 |
| S13 | 3.5730E−03 | −4.0097E−04 | 2.2679E−05 | −4.2692E−07 |
| S14 | 6.7991E−04 | −4.5035E−05 | −8.4271E−07 | 2.0364E−07 |

TABLE 24

| parameter | f1 (mm) | f2 (mm) | f3 (mm) | f4 (mm) | f5 (mm) | f6 (mm) | f7 (mm) | f (mm) | TTL (mm) | HFOV (°) |
|---|---|---|---|---|---|---|---|---|---|---|
| value | 7.83 | −6.58 | 3.90 | 65.35 | 12.72 | 11.21 | −3.46 | 4.02 | 4.70 | 37.1 |

Figure 16A:
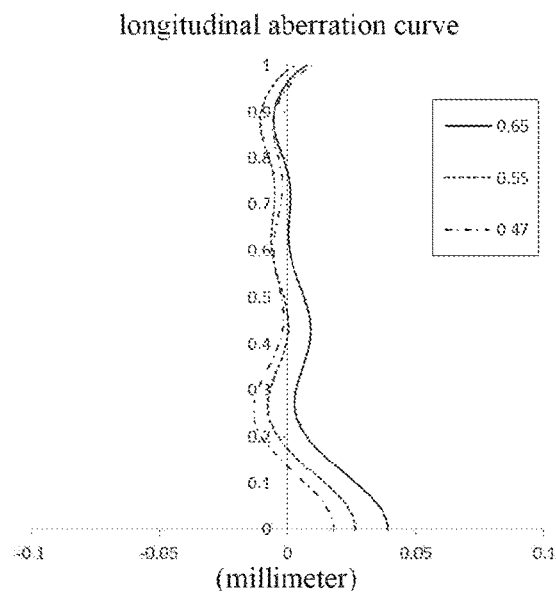
FIGS. 16A-16D respectively illustrate a longitudinal aberration curve, an astigmatic curve, a distortion curve and a lateral color curve of the camera lens assembly according to Embodiment 8.
Figure 16B:
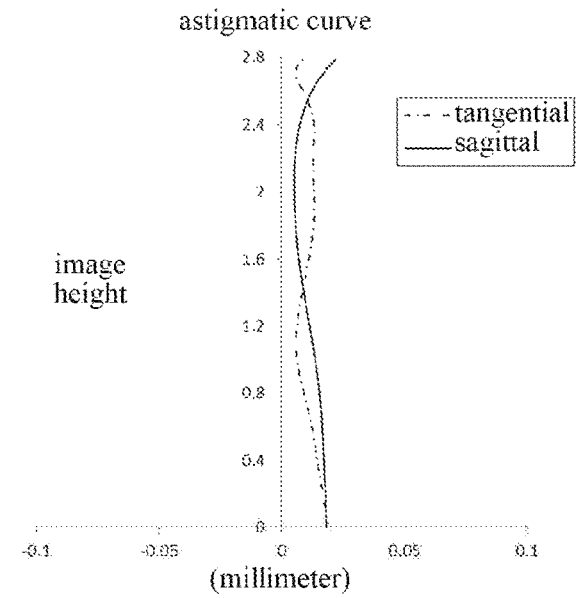
Figure 16C:
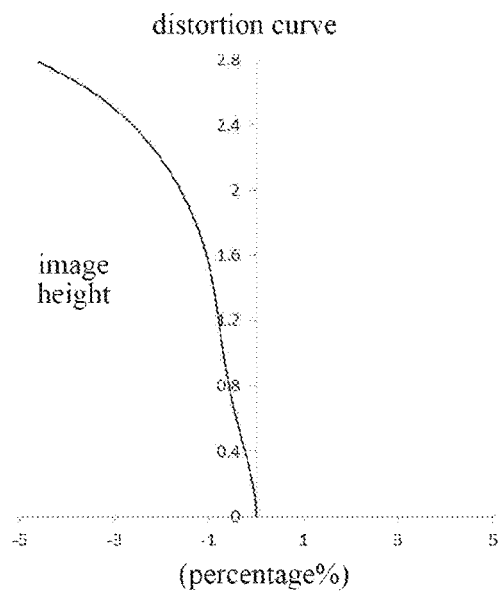
Figure 16D:
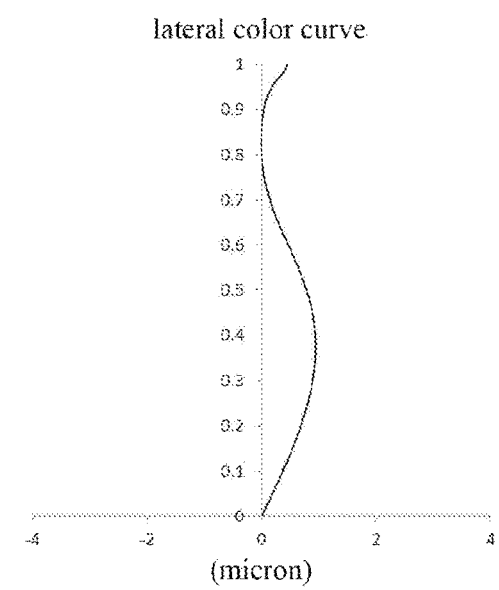

FIG. 16A illustrates the longitudinal aberration curve of the camera lens assembly according to Embodiment 8, representing deviations of focal points of light of different wavelengths converged after passing through the lens assembly. FIG. 16B illustrates the astigmatic curve of the camera lens assembly according to Embodiment 8, representing a curvature of the tangential image plane and a curvature of the sagittal image plane. FIG. 16C illustrates the distortion curve of the camera lens assembly according to Embodiment 8, representing amounts of distortion at different viewing angles. FIG. 16D illustrates the lateral color curve of the camera lens assembly according to Embodiment 8, representing deviations of different image heights on the image plane after light passes through the lens assembly. It can be seen from FIGS. 16A-16D that the camera lens assembly according to Embodiment 8 can achieve a good imaging quality.

Embodiment 9

A camera lens assembly according to Embodiment 9 of the present disclosure is described below with reference to FIGS. 17-18D. FIG. 17 is a schematic structural diagram illustrating the camera lens assembly according to Embodiment 9 of the present disclosure.

As shown in FIG. 17, the camera lens assembly includes, sequentially along the optical axis from the object side to the image side, a first lens E1, a second lens E2, a third lens E3, a fourth lens E4, a fifth lens E5, a sixth lens E6, a seventh lens E7 and an image plane S15. Here, the image plane S15 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Light from an object sequentially passes through the surfaces S1-S14 and finally forms an image on the image plane S15.

Alternatively, a diaphragm STO for limiting the light beam may be disposed between the third lens E3 and the fourth lens E4, for improving the imaging quality of the camera lens assembly.

In the present embodiment, the seventh lens E7 is the negative lens closest to the image side, and the sixth lens E6 is the positive lens closest to the image side.

Table 25 shows the surface type, the radius of curvature, the thickness, the material and the conic coefficient of each lens of the camera lens assembly in Embodiment 9. The radius of curvature and the thickness are shown in millimeters (mm). Table 26 shows the high-order coefficients of the aspheric surfaces in Embodiment 9. Here, the surface types of the aspheric surfaces may be defined by the formula (1) given in the above Embodiment 1. Table 27 below shows the effective focal lengths f1-f7 of the lenses in Embodiment 9, the total effective focal length f of the camera lens assembly, the total track length TTL of the camera lens assembly and the half of the maximal field-of-view HFOV of the camera lens assembly.

TABLE 25

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.7856 | 0.4361 | 1.55 | 56.1 | −0.4783 |
| S2 | aspheric | 2.7234 | 0.0863 | | | −0.5600 |
| S3 | aspheric | 2.7259 | 0.2500 | 1.67 | 20.4 | −0.1750 |
| S4 | aspheric | 1.6645 | 0.0981 | | | 0.1839 |
| S5 | aspheric | 1.9164 | 0.7046 | 1.55 | 56.1 | 0.4872 |
| S6 | aspheric | 13.9721 | 0.0787 | | | 99.0000 |
| STO | spherical | infinite | 0.0544 | | | |
| S7 | aspheric | 2.7320 | 0.2816 | 1.67 | 20.4 | −24.7401 |
| S8 | aspheric | 2.8948 | 0.2636 | | | −4.3429 |
| S9 | aspheric | 7.1426 | 0.2749 | 1.54 | 55.9 | 13.8631 |
| S10 | aspheric | 252.5120 | 0.3833 | | | 0.0000 |
| S11 | aspheric | −3.4169 | 0.3378 | 1.64 | 23.5 | 5.9680 |
| S12 | aspheric | −2.3730 | 0.5385 | | | 0.9802 |
| S13 | aspheric | −3.1580 | 0.2500 | 1.54 | 55.9 | −1.3879 |
| S14 | aspheric | 3.8652 | 0.6621 | | | −99.0000 |
| S15 | spherical | −17.2056 | | | | |

TABLE 26

| surface number | A4 | A6 | A8 | A10 | A12 |
|---|---|---|---|---|---|
| S1 | −9.4753E−03 | −8.1446E−03 | 7.8437E−04 | −4.6760E−03 | 1.7082E−03 |
| S2 | −4.3517E−03 | −4.9353E−04 | −4.8205E−04 | −5.9158E−05 | −2.7371E−05 |
| S3 | −1.5228E−03 | 1.3947E−03 | 1.0852E−03 | 4.7664E−04 | 2.1245E−04 |
| S4 | −4.7173E−03 | 1.5140E−02 | −3.4241E−02 | 1.4478E−02 | 5.7445E−03 |
| S5 | 1.4701E−02 | 1.3909E−02 | 2.7558E−03 | 9.5856E−04 | −1.2997E−03 |
| S6 | −9.2324E−02 | 9.4445E−02 | 5.6915E−02 | −2.6374E−01 | 2.6846E−01 |
| S7 | 4.1203E−02 | −9.5334E−02 | 2.5820E−01 | −3.4394E−01 | 2.6993E−01 |
| S8 | −2.8721E−02 | 1.1958E−02 | 3.6471E−02 | −1.2805E−02 | −7.4046E−03 |
| S9 | −9.8594E−03 | −3.5243E−02 | −2.0997E−02 | 1.1688E−02 | −2.1159E−02 |
| S10 | 2.3873E−02 | −2.6355E−02 | 9.8982E−04 | −7.5050E−03 | −5.2197E−03 |
| S11 | 3.5498E−02 | −4.5602E−02 | −3.0561E−02 | 4.8086E−02 | −1.5816E−02 |
| S12 | 9.5155E−02 | −5.6880E−02 | 5.0455E−02 | 5.1527E−03 | 2.4634E−03 |
| S13 | −2.1186E−02 | 8.9298E−03 | −1.9576E−04 | −1.0669E−04 | 1.9677E−07 |
| S14 | −4.5024E−02 | 9.4345E−03 | −1.0350E−03 | −1.0993E−04 | 2.2900E−05 |

| surface number | A14 | A16 | A18 | A20 |
|---|---|---|---|---|
| S1 | −1.1094E−04 | 0 | 0 | 0 |
| S2 | −4.0943E−05 | −4.0882E−05 | −1.4031E−05 | 1.6286E−05 |
| S3 | 1.0641E−04 | 3.9979E−05 | −9.0008E−06 | −4.1680E−05 |
| S4 | −3.5432E−03 | 2.8462E−04 | 1.6200E−11 | 1.5894E−12 |
| S5 | 8.0560E−04 | −5.9269E−04 | −4.7930E−12 | −1.3370E−12 |
| S6 | −9.7705E−02 | −9.9425E−12 | 1.1256E−11 | −2.0018E−12 |
| S7 | −1.1816E−01 | 8.7390E−13 | 7.8758E−12 | −1.4279E−12 |
| S8 | −8.5217E−03 | −5.0774E−12 | 5.1856E−13 | −5.2980E−14 |
| S9 | −5.3090E−04 | 6.5384E−12 | −5.2464E−12 | 7.8567E−13 |
| S10 | 4.8011E−03 | 0 | 0 | 0 |
| S11 | 3.5447E−03 | 0 | 0 | 0 |
| S12 | −1.1393E−03 | 0 | 0 | 0 |
| S13 | 3.2223E−07 | 0 | 0 | 0 |
| S14 | −1.4192E−06 | 0 | 0 | 0 |

TABLE 27

| parameter | f1 (mm) | f2 (mm) | f3 (mm) | f4 (mm) | f5 (mm) | f6 (mm) | f7 (mm) | f (mm) | TTL (mm) | HFOV (°) |
|---|---|---|---|---|---|---|---|---|---|---|
| value | 8.15 | −7.08 | 3.98 | 43.07 | 13.68 | 10.70 | −3.20 | 4.02 | 4.70 | 37.1 |

Figure 18C:
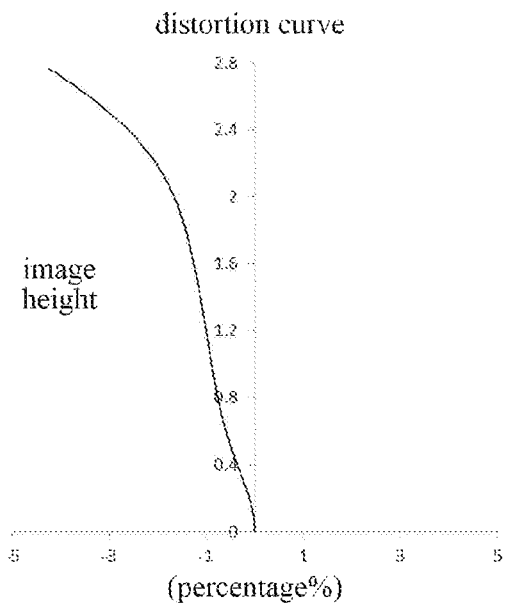
Figure 18D:
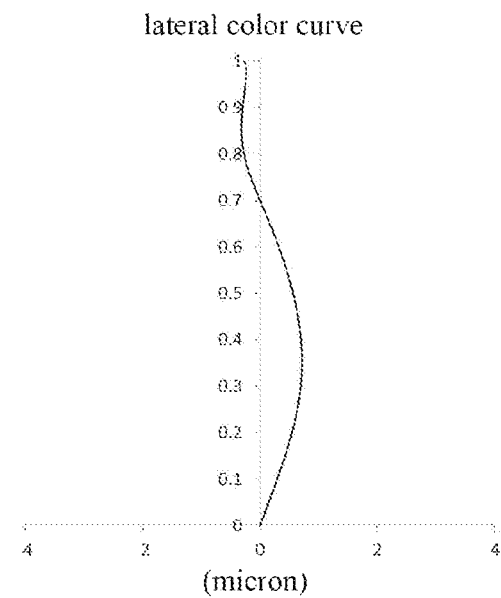

FIG. 18A illustrates the longitudinal aberration curve of the camera lens assembly according to Embodiment 9, representing deviations of focal points of light of different wavelengths converged after passing through the lens assembly. FIG. 18B illustrates the astigmatic curve of the camera lens assembly according to Embodiment 9, representing a curvature of the tangential image plane and a curvature of the sagittal image plane. FIG. 18C illustrates the distortion curve of the camera lens assembly according to Embodiment 9, representing amounts of distortion at different viewing angles. FIG. 18D illustrates the lateral color curve of the camera lens assembly according to Embodiment 9, representing deviations of different image heights on the image plane after light passes through the lens assembly. It can be seen from FIGS. 18A-18D that the camera lens assembly according to Embodiment 9 can achieve a good imaging quality.

Embodiment 10

Figure 19:
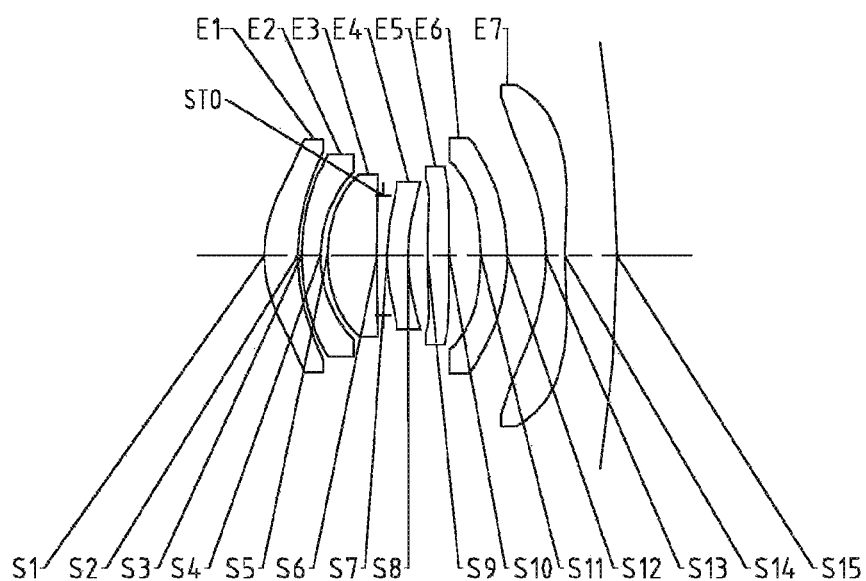
FIG. 19 is a schematic structural diagram illustrating a camera lens assembly according to Embodiment 10 of the present disclosure.

A camera lens assembly according to Embodiment 10 of the present disclosure is described below with reference to FIGS. 19-20D. FIG. 19 is a schematic structural diagram illustrating the camera lens assembly according to Embodiment 10 of the present disclosure.

As shown in FIG. 19, the camera lens assembly includes, sequentially along the optical axis from the object side to the image side, a first lens E1, a second lens E2, a third lens E3, a fourth lens E4, a fifth lens E5, a sixth lens E6, a seventh lens E7 and an image plane S15. Here, the image plane S15 is a curved surface that is convex toward the image side at the paraxial area.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a negative refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Light from an object sequentially passes through the surfaces S1-S14 and finally forms an image on the image plane S15.

Alternatively, a diaphragm STO for limiting the light beam may be disposed between the third lens E3 and the fourth lens E4, for improving the imaging quality of the camera lens assembly.

In the present embodiment, the seventh lens E7 is the negative lens closest to the image side, and the sixth lens E6 is the positive lens closest to the image side.

Table 28 shows the surface type, the radius of curvature, the thickness, the material and the conic coefficient of each lens of the camera lens assembly in Embodiment 10. The radius of curvature and the thickness are shown in millimeters (mm). Table 29 shows the high-order coefficients of the aspheric surfaces in Embodiment 10. Here, the surface types of the aspheric surfaces may be defined by the formula (1) given in the above Embodiment 1. Table 30 below shows the effective focal lengths f1-f7 of the lenses in Embodiment 10, the total effective focal length f of the camera lens assembly, the total track length TTL of the camera lens assembly and the half of the maximal field-of-view HFOV of the camera lens assembly.

TABLE 28

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7758 | 0.4474 | 1.55 | 56.1 | −0.4796 |
| S2 | aspheric | 2.8510 | 0.0500 | | | −0.4295 |
| S3 | aspheric | 2.8517 | 0.2500 | 1.67 | 20.4 | −0.2916 |
| S4 | aspheric | 1.6616 | 0.0960 | | | 0.1778 |
| S5 | aspheric | 1.9013 | 0.6595 | 1.55 | 56.1 | 0.5491 |
| S6 | aspheric | 12.7848 | 0.0804 | | | 99.0000 |
| STO | spherical | infinite | 0.0549 | | | |
| S7 | aspheric | 2.5846 | 0.2812 | 1.67 | 20.4 | −21.5746 |
| S8 | aspheric | 2.7044 | 0.2563 | | | −3.5752 |
| S9 | aspheric | 8.4588 | 0.2896 | 1.54 | 55.9 | 3.2894 |
| S10 | aspheric | −49.4589 | 0.4226 | | | 0.0000 |
| S11 | aspheric | −3.3465 | 0.3509 | 1.64 | 23.5 | 5.9765 |
| S12 | aspheric | −2.4157 | 0.5138 | | | 1.1190 |
| S13 | aspheric | −3.1355 | 0.2500 | 1.54 | 55.9 | −1.5265 |
| S14 | aspheric | 5.1298 | 0.6973 | | | −99.0000 |
| S15 | spherical | −18.4604 | | | | |

TABLE 29

| surface number | A4 | A6 | A8 | A10 | A12 |
|---|---|---|---|---|---|
| S1 | −9.4343E−03 | −8.3426E−03 | 7.9909E−04 | −4.6470E−03 | 1.7300E−03 |
| S2 | −3.4308E−03 | −8.6372E−05 | −3.0731E−04 | −4.3545E−03 | 1.4284E−06 |
| S3 | −2.1187E−03 | 7.0835E−04 | 7.7288E−04 | 4.2184E−04 | 2.2715E−04 |
| S4 | −7.4202E−03 | 1.4945E−02 | −3.3317E−02 | 1.4990E−02 | 5.8679E−03 |
| S5 | 1.4058E−02 | 1.7971E−02 | 3.9204E−03 | 2.0450E−03 | −4.1654E−04 |
| S6 | −9.3315E−02 | 8.9463E−02 | 5.7780E−02 | −2.5936E−01 | 2.6509E−01 |
| S7 | 4.8002E−02 | −9.5372E−02 | 2.5522E−01 | −3.4746E−01 | 2.6280E−01 |
| S8 | −2.4574E−02 | 1.8342E−02 | 3.5592E−02 | −1.5638E−02 | −1.0391E−02 |
| S9 | −1.5102E−02 | −2.8843E−02 | −1.9253E−02 | 1.2871E−02 | −1.9140E−02 |
| S10 | 1.1988E−02 | −2.4404E−02 | 4.8175E−03 | −6.0862E−03 | −5.1195E−03 |
| S11 | 1.7364E−02 | −4.6444E−02 | −3.3318E−02 | 4.7742E−02 | −1.4978E−02 |
| S12 | 8.3230E−02 | −5.7597E−02 | 5.5168E−03 | 5.2438E−03 | 2.4811E−03 |
| S13 | −2.2738E−02 | 8.7573E−03 | −1.8348E−04 | −1.0384E−04 | 4.0418E−07 |
| S14 | −4.7762E−02 | 9.7745E−03 | −1.0579E−03 | −1.1449E−04 | 2.2579E−05 |

| surface number | A14 | A16 | A18 | A20 |
|---|---|---|---|---|
| S1 | −9.9183E−05 | 0 | 0 | 0 |
| S2 | −2.4917E−05 | −3.1530E−05 | −9.6032E−06 | 1.8009E−05 |
| S3 | 1.2196E−04 | 4.8125E−05 | −3.1134E−06 | −3.5800E−05 |
| S4 | −3.3193E−03 | 7.4391E−04 | −5.3378E−09 | 8.3653E−10 |
| S5 | 8.5506E−04 | −4.9389E−09 | −1.8118E−09 | 1.6120E−09 |
| S6 | −9.7705E−02 | −1.0544E−07 | 4.1208E−08 | −2.9720E−09 |
| S7 | −1.1816E−01 | 2.1890E−08 | 8.1709E−09 | −1.0764E−08 |
| S8 | −8.5217E−03 | −2.9796E−08 | 2.7091E−08 | −8.5979E−09 |
| S9 | −5.3075E−04 | −8.7903E−08 | 2.2028E−08 | 4.0324E−10 |
| S10 | 4.5977E−03 | 0 | 0 | 0 |
| S11 | 4.4948E−03 | 0 | 0 | 0 |
| S12 | −1.1309E−03 | 0 | 0 | 0 |
| S13 | 2.6489E−07 | 0 | 0 | 0 |
| S14 | −1.4244E−06 | 0 | 0 | 0 |

TABLE 30

| parameter | f1 (mm) | f2 (mm) | f3 (mm) | f4 (mm) | f5 (mm) | f6 (mm) | f7 (mm) | f (mm) | TTL (mm) | HFOV (°) |
|---|---|---|---|---|---|---|---|---|---|---|
| value | 7.52 | −6.52 | 4.00 | 45.13 | 13.48 | 11.74 | −3.59 | 4.02 | 4.70 | 37.1 |

Figure 20A:
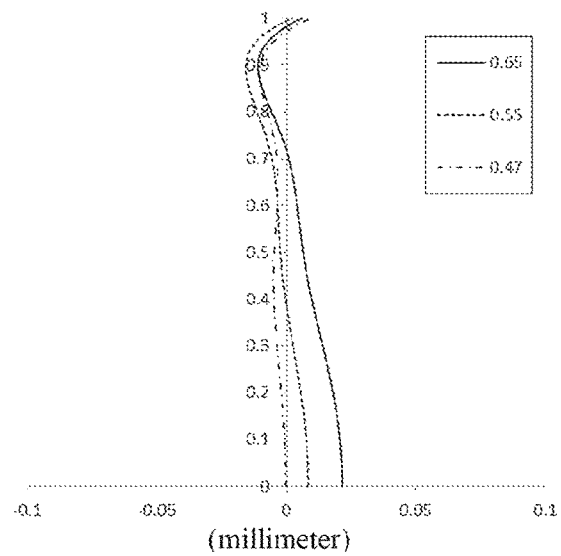
FIGS. 20A-20D respectively illustrate a longitudinal aberration curve, an astigmatic curve, a distortion curve and a lateral color curve of the camera lens assembly according to Embodiment 10.
Figure 20B:
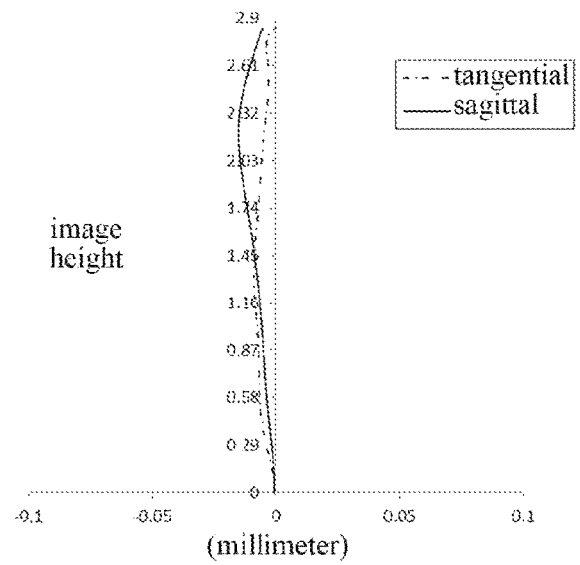
Figure 20C:
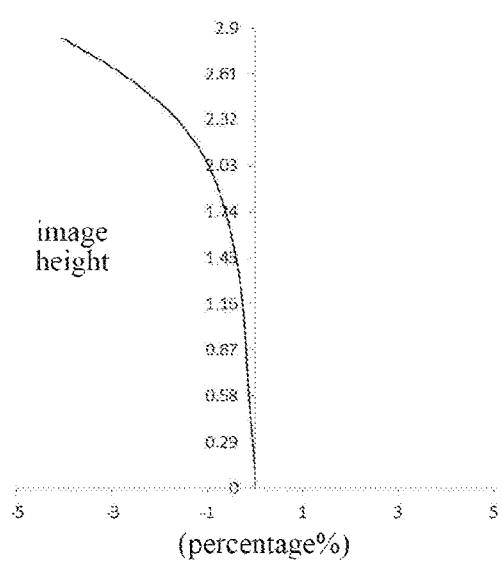
Figure 20D:
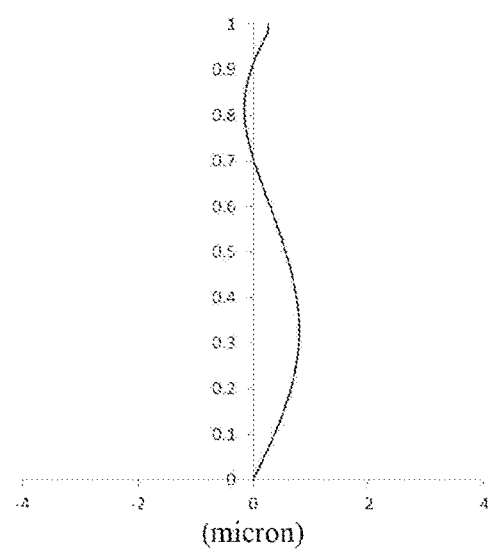

FIG. 20A illustrates the longitudinal aberration curve of the camera lens assembly according to Embodiment 10, representing deviations of focal points of light of different wavelengths converged after passing through the lens assembly. FIG. 20B illustrates the astigmatic curve of the camera lens assembly according to Embodiment 10, representing a curvature of the tangential image plane and a curvature of the sagittal image plane. FIG. 20C illustrates the distortion curve of the camera lens assembly according to Embodiment 10, representing amounts of distortion at different viewing angles. FIG. 20D illustrates the lateral color curve of the camera lens assembly according to Embodiment 10, representing deviations of different image heights on the image plane after light passes through the lens assembly. It can be seen from FIGS. 20A-20D that the camera lens assembly according to Embodiment 10 can achieve a good imaging quality.

To sum up, Embodiments 1-10 respectively satisfy the relationships shown in Table 31 below.

TABLE 31

| Conditional Expression | Embodiment | | | | | | | | | |
|---|---|---|---|---|---|---|---|---|---|---|
| | 1 | 2 | 3 | 4 | 5 | 6 | 7 | 8 | 9 | 10 |
| EPD/ImgH | 0.63 | 0.63 | 0.63 | 0.64 | 0.69 | 0.77 | 0.63 | 0.77 | 0.78 | 0.72 |
| f/EPD | 1.79 | 1.79 | 1.79 | 2.67 | 1.70 | 1.89 | 2.00 | 1.87 | 1.87 | 1.98 |
| TTL (mm) | 3.45 | 3.45 | 3.45 | 5.30 | 4.72 | 4.70 | 4.71 | 4.70 | 4.70 | 4.70 |
| |f/R1| | 0.04 | 0.04 | 0.04 | 0.11 | 0.04 | 0.30 | 0.22 | 0.24 | 0.23 | 0.22 |
| f/R1 | 2.32 | 2.32 | 2.32 | 3.71 | 2.53 | 2.26 | 2.39 | 2.26 | 2.25 | 2.27 |
| f1/fn | −0.58 | −0.57 | −0.53 | −0.55 | −1.90 | −2.03 | −1.26 | −2.26 | −2.55 | −2.10 |
| V1/Vp | 1.00 | 1.00 | 1.00 | 2.74 | 1.00 | 2.39 | 2.39 | 2.39 | 2.39 | 2.39 |
| CT1/CTp | 1.37 | 1.30 | 1.34 | 1.84 | 1.12 | 1.24 | 1.50 | 1.28 | 1.29 | 1.27 |
| CT2/CTn | 0.60 | 0.60 | 0.56 | 0.82 | 0.64 | 1.00 | 0.98 | 1.00 | 1.00 | 1.00 |
| TTL/ImgH | 1.44 | 1.44 | 1.44 | 1.64 | 1.40 | 1.71 | 1.48 | 1.69 | 1.70 | 1.65 |

The present disclosure further provides a camera device, having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone. The camera device is equipped with the camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. A camera lens assembly comprising, sequentially along an optical axis from an object side to an image side: a first lens having a positive refractive power, a second lens having a negative refractive power, a third lens, a fourth lens, a fifth lens, a sixth lens and a seventh lens, wherein the fifth lens has a positive refractive power, the seventh lens is a negative lens having a negative refractive power, and the sixth lens is a positive lens having a positive refractive power; and the camera lens assembly further comprises a curved image plane, and a radius of curvature RI of the image plane and a total effective focal length f of the camera lens assembly satisfy: $|f/RI| \leq 0.35$, wherein each of the third lens and the fourth lens has a positive refractive power.

2. The camera lens assembly according to claim 1, wherein an object-side surface of the first lens is a convex surface, and a radius of curvature R1 of the object-side surface of the first lens and the total effective focal length f of the camera lens assembly satisfy:

$2 < f/R1 < 5$.

3. The camera lens assembly according to claim 1, wherein an effective focal length f1 of the first lens and an effective focal length fn of the negative lens satisfy: $-3.0 < f1/fn \leq -0.5$.

4. The camera lens assembly according to claim 1, wherein a center thickness CT2 of the second lens on the optical axis and a center thickness CTn of the negative lens on the optical axis satisfy: $0.5 \leq CT2/CTn \leq 1.0$.

5. The camera lens assembly according to claim 1, wherein an abbe number V1 of the first lens and an abbe number Vp of the positive lens satisfy: $1 \leq V1/Vp < 3$.

6. The camera lens assembly according to claim 1, wherein a center thickness CT1 of the first lens on the optical axis and a center thickness CTp of the positive lens on the optical axis satisfy: $1 < CT1/CTp < 2$.

7. The camera lens assembly according to claim 1, wherein an entrance pupil diameter EPD of the camera lens assembly and half a maximum image height ImgH of the camera lens assembly satisfy: $0.6 \leq EPD/ImgH \leq 0.8$.

8. The camera lens assembly according to claim 1, wherein the total effective focal length f of the camera lens assembly and the entrance pupil diameter EPD of the camera lens assembly satisfy: $1.5 \leq f/EPD \leq 2.8$.

9. The camera lens assembly according to claim 1, wherein a distance TTL on the optical axis from an object-side surface of the first lens to the image plane satisfies: $3.0 \text{ mm} < TTL < 7.5 \text{ mm}$.

10. The camera lens assembly according to claim 9, wherein the distance TTL on the optical axis from the object-side surface of the first lens to the image plane and half a maximum image height ImgH of the camera lens assembly satisfy: $TTL/ImgH \leq 1.75$.

11. The camera lens assembly according to claim 1, wherein an image-side surface of the seventh lens is a concave surface.

* * * * *